United States Patent
Gu et al.

(10) Patent No.: US 10,225,098 B2
(45) Date of Patent: *Mar. 5, 2019

(54) METHODS, DEVICES AND SYSTEMS FOR SUPPORTING WIRELESS COMMUNICATION

(71) Applicant: CASSIA NETWORKS INC., San Jose, CA (US)

(72) Inventors: Daguang Gu, Beijing (CN); Fuyong Zhao, San Jose, CA (US); Kunpeng Zhang, Beijing (CN)

(73) Assignee: Cassia Networks Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/615,391

(22) Filed: Jun. 6, 2017

(65) Prior Publication Data

US 2017/0272270 A1 Sep. 21, 2017

Related U.S. Application Data

(63) Continuation-in-part of application No. 14/789,614, filed on Jul. 1, 2015, now Pat. No. 9,730,003.

(Continued)

(51) Int. Cl.
*H04W 4/80* (2018.01)
*H04B 7/14* (2006.01)
(Continued)

(52) U.S. Cl.
CPC ..... *H04L 12/2838* (2013.01); *H04B 7/15507* (2013.01); *H04B 17/318* (2015.01);
(Continued)

(58) Field of Classification Search
CPC combination set(s) only.
See application file for complete search history.

(56) References Cited

U.S. PATENT DOCUMENTS 5,408,197 A 4/1995 Miyake
5,513,382 A 4/1996 Agahi-Kesheh
(Continued)

FOREIGN PATENT DOCUMENTS

WO 2014082665 6/2014

OTHER PUBLICATIONS

International Application No. PCT/US2017/036141, International Search Report and Written Opinion dated Sep. 1, 2017.
(Continued)

*Primary Examiner* — Cindy Trandai
(74) *Attorney, Agent, or Firm* — Sheppard, Mullin, Richter & Hampton LLP

(57) ABSTRACT

A device for supporting wireless communication is provided. The device may comprise a first Bluetooth chip for communicating with a Bluetooth device and a second Bluetooth chip for communicating with a client device. The second Bluetooth chip may be configured to receive advertising data of the Bluetooth device from the first Bluetooth chip and broadcast advertising data including the received advertising data of the Bluetooth device. The first Bluetooth chip and the second Bluetooth chip may be configured to establish communication links between the client device and the second Bluetooth chip, between the second Bluetooth chip and the first Bluetooth chip, and between the first Bluetooth chip and the Bluetooth device.

20 Claims, 20 Drawing Sheets

Related U.S. Application Data

(60) Provisional application No. 62/346,771, filed on Jun. 7, 2016, provisional application No. 62/110,262, filed on Jan. 30, 2015, provisional application No. 62/110,250, filed on Jan. 30, 2015.

(51) Int. Cl.

| | | |
|---|---|---|
| *H04L 12/28* | (2006.01) | |
| *H04B 7/155* | (2006.01) | |
| *H04B 17/318* | (2015.01) | |
| H01R 31/00 | (2006.01) | |
| H04W 84/18 | (2009.01) | |
| H04L 12/46 | (2006.01) | |
| H04W 88/10 | (2009.01) | |
| H04L 29/12 | (2006.01) | |

(52) U.S. Cl.
CPC ............ *H04W 4/80* (2018.02); *H01R 31/005* (2013.01); *H04L 12/4625* (2013.01); *H04L 61/6022* (2013.01); *H04W 84/18* (2013.01); *H04W 88/10* (2013.01)

(56) References Cited

U.S. PATENT DOCUMENTS

| | | | |
|---|---|---|---|
| 5,521,561 A | 5/1996 | Yrjola | |
| 5,689,817 A | 11/1997 | Fok | |
| 6,054,896 A | 4/2000 | Wright | |
| 6,097,703 A | 8/2000 | Larsen | |
| 6,236,622 B1 | 5/2001 | Blackman | |
| 7,363,003 B2 | 4/2008 | Takatani | |
| 9,264,907 B2 | 2/2016 | Laroia | |
| 2002/0028655 A1 | 3/2002 | Rosener | |
| 2005/0070329 A1 | 3/2005 | Lection | |
| 2005/0212708 A1 | 9/2005 | Fifield | |
| 2005/0248962 A1 | 11/2005 | Searfoss | |
| 2007/0041344 A1 | 2/2007 | Yaqub | |
| 2007/0188358 A1 | 8/2007 | Somayajula | |
| 2007/0222697 A1 | 9/2007 | Caimi | |
| 2008/0043996 A1 | 2/2008 | Dolph | |
| 2008/0318549 A1 | 12/2008 | Skubic | |
| 2009/0023499 A1 | 1/2009 | Mao | |
| 2009/0147884 A1 | 6/2009 | Sridharan | |
| 2009/0303387 A1 | 12/2009 | Chen | |
| 2010/0048131 A1* | 2/2010 | Hirsch | H04R 3/005 455/41.3 |
| 2010/0103316 A1 | 4/2010 | Colsey | |
| 2010/0303244 A1 | 12/2010 | Kim | |
| 2011/0028093 A1 | 2/2011 | Patel | |
| 2011/0117842 A1 | 5/2011 | Hong | |
| 2011/0142413 A1 | 6/2011 | Kang | |
| 2011/0249596 A1 | 10/2011 | Ross | |
| 2012/0057518 A1* | 3/2012 | Herrala | H04W 84/20 370/315 |
| 2012/0116548 A1 | 5/2012 | Goree | |
| 2012/0165006 A1 | 6/2012 | Ge | |
| 2013/0033996 A1 | 2/2013 | Song | |
| 2013/0045684 A1 | 2/2013 | Linde | |
| 2013/0048734 A1 | 2/2013 | Bianconi | |
| 2013/0148020 A1 | 6/2013 | Cook | |
| 2013/0154897 A1 | 6/2013 | Sorensen | |
| 2013/0254159 A1 | 9/2013 | Thramann | |
| 2013/0337739 A1 | 12/2013 | Bernsen | |
| 2014/0006947 A1 | 1/2014 | Garmark | |
| 2014/0041038 A1 | 2/2014 | Lessin | |
| 2014/0073244 A1* | 3/2014 | Ko | H04W 76/14 455/41.1 |
| 2014/0119407 A1 | 5/2014 | Miller | |
| 2014/0169599 A1 | 6/2014 | Solum | |
| 2014/0213189 A1* | 7/2014 | Kim | H04M 1/7253 455/41.2 |
| 2014/0213197 A1 | 7/2014 | An | |
| 2014/0287704 A1 | 9/2014 | Dupuy | |
| 2014/0327578 A1 | 11/2014 | Rowson | |
| 2015/0004913 A1 | 1/2015 | Linde | |
| 2015/0031288 A1 | 1/2015 | Tubbesing | |
| 2015/0095170 A1 | 4/2015 | Lang | |
| 2015/0105022 A1* | 4/2015 | Jung | H04W 4/80 455/41.2 |
| 2015/0382436 A1* | 12/2015 | Kelly | G08C 17/02 315/131 |
| 2016/0065295 A1 | 3/2016 | Stanescu | |
| 2016/0088424 A1* | 3/2016 | Polo | H04W 4/80 455/41.1 |
| 2016/0119438 A1 | 4/2016 | Abramson | |
| 2016/0154392 A1 | 6/2016 | Jo | |
| 2016/0157048 A1* | 6/2016 | Kerai | H04W 84/18 455/41.2 |
| 2016/0258617 A1 | 9/2016 | Wang | |
| 2017/0099597 A1* | 4/2017 | Choi | H04W 8/005 |
| 2017/0201854 A1* | 7/2017 | Choi | H04W 72/0406 |
| 2017/0215030 A1* | 7/2017 | Choi | H04W 8/005 |
| 2017/0353979 A1* | 12/2017 | Lee | H04W 76/10 |

OTHER PUBLICATIONS

Non-Final Office Action for U.S. Appl. No. 14/919,124, dated Oct. 7, 2016, 14 pages.
Non-Final Office Action for U.S. Appl. No. 14/930,307, dated Oct. 20, 2016, 15 pages.
International Application No. PCT/US2016/015124, International Search Report and Written Opinion dated May 26, 2016.
International Application No. PCT/US2016/015617, International Search Report and Written Opinion dated Apr. 21, 2016.
International Application No. PCT/US2016/015105, International Search Report and Written Opinion dated Jun. 3, 2016.
Final Office Action for U.S. Appl. No. 14/919,124, dated Apr. 7, 2017, 13 pages.
Non-Final Office Action for U.S. Appl. No. 15/450,534, dated Apr. 7, 2017, 8 pages.

\* cited by examiner

METHODS, DEVICES AND SYSTEMS FOR SUPPORTING WIRELESS COMMUNICATION

CROSS-REFERENCE TO RELATED APPLICATIONS

This application is based on and claims the benefit of priority of U.S. Provisional Application Ser. No. 62/346,771, filed Jun. 7, 2016, and entitled "METHODS, DEVICES AND SYSTEMS FOR SUPPORTING WIRELESS COMMUNICATION." This application is also continuation-in-part application of U.S. Non-Provisional application Ser. No. 14/789,614, filed Jul. 1, 2015, and entitled "METHODS, DEVICES AND SYSTEMS FOR SUPPORTING WIRELESS COMMUNICATION." The application Ser. No. 14/789,614 is based on and claims priority to U.S. Provisional Application No. 62/110,250, filed Jan. 30, 2015, entitled "METHODS, DEVICES AND SYSTEMS FOR INCREASING WIRELESS COMMUNICATION RANGE," and U.S. Provisional Application No. 62/110,262, filed Jan. 30, 2015, entitled "BLUETOOTH TRANSPARENT RELAY." The entirety of all of the aforementioned applications is incorporated herein by reference.

TECHNICAL FIELD

This disclosure relates generally to a field of wireless communication and, more particularly, to methods, devices, and systems for facilitating wireless communication in a Bluetooth network.

BACKGROUND

Bluetooth devices such as Bluetooth speakers, smart locks, and various smart Bluetooth sensors and wearable devices, have become widely used in many applications. Frequently multiple Bluetooth devices are present in the same area for a variety of uses. Since the application interface for each of the Bluetooth devices may be different, a user of a Bluetooth-enabled client device, such as a smart phone or personal computer, may need to access various application interfaces in order to control the different Bluetooth devices. The process of managing the Bluetooth devices can be cumbersome when the number of Bluetooth devices controlled by the client device increases. Thus, a more user-friendly solution for controlling multiple Bluetooth devices is desired.

Further, as Bluetooth technology is designed for low power and low cost operation, the communication range of Bluetooth devices is typically quite short. For example, the typical communication range of Bluetooth devices, such as between a smart phone and a Bluetooth Low Energy (BLE) sensor, is limited to tens of meters in open space and a few meters inside a house, and the Bluetooth transmission typically cannot penetrate walls. The short communication range limits the use of Bluetooth devices in scenarios where longer communication range is required.

Conventional schemes to increase wireless communication range typically involve increasing the transmission power or antenna gain on both sides of the radio frequency transmission. However, for Bluetooth devices, especially the BLE sensors and wearable devices, increasing the transmission power or antenna gain of the devices is often impractical and would defeat the design goal of low power and low cost Bluetooth devices. Thus, it is desired to extend the communication range of Bluetooth devices without having to increase the transmission power or production cost of the Bluetooth devices.

SUMMARY

The present disclosure provides a device for supporting wireless communication. Consistent with some embodiments, the device includes a Bluetooth transceiver for communicating with a Bluetooth device, a network interface for communicating with a client device, a database for storing a plurality of Bluetooth service characteristics, one or more processors, and a memory for storing instructions executable by the one or more processors. The one or more processors may be configured to after connecting to the Bluetooth device via the Bluetooth transceiver, retrieve one or more service characteristics associated with the Bluetooth device. The one or more processors may be further configured to determine whether each of the one or more service characteristics associated with the Bluetooth device is included in the database, receive a request from the client device via the network interface for performing an operation on the Bluetooth device, and if each of the one or more service characteristics associated with the Bluetooth device is included in the database, communicate with the Bluetooth device based on the request and the one or more service characteristics associated with the Bluetooth device.

Consistent with some embodiments, this disclosure provides another device for supporting wireless communication. The device includes a first Bluetooth transceiver for connecting to a Bluetooth device, a second Bluetooth transceiver for connecting to a client device, one or more processors, and a memory for storing instructions executable by the one or more processors. The one or more processors are configured to scan for one or more available Bluetooth devices via the first Bluetooth transceiver, establish a first communication connection with the Bluetooth device via the first Bluetooth transceiver, establish a second communication connection with the client device via the second Bluetooth transceiver, receive data from the client device via the second communication connection, and forward the data to the Bluetooth device via the first communication connection.

Consistent with some embodiments, this disclosure provides another device for supporting wireless communication. The device includes a Bluetooth transceiver, one or more processors, and a memory for storing instructions executable by the one or more processors. The one or more processors are configured to scan for one or more available Bluetooth devices via the Bluetooth transceiver, establish a first communication connection with a Bluetooth device via the Bluetooth transceiver, establish a second communication connection with a client device via the Bluetooth transceiver, receive data from the client device via the second communication connection, and forward the data to the Bluetooth device via the first communication connection.

Consistent with some embodiments, this disclosure provides a method for supporting wireless communication. The method includes retrieving one or more service characteristics associated with a Bluetooth device by establishing a connection with the Bluetooth device, and determining, at a Bluetooth hub, whether each of the one or more service characteristics associated with the Bluetooth device is included in a database stored in the Bluetooth hub. The method may further include receiving, at the Bluetooth hub, a request from a client device for performing an operation on the Bluetooth device. The method may further include if each of the one or more service characteristics associated with the Bluetooth device is included in the database, communicating with the Bluetooth device based on the request and the one or more service characteristics associated with the Bluetooth device.

Consistent with some embodiments, this disclosure provides another method for supporting wireless communication. The method includes scanning for one or more available Bluetooth devices, establishing a first communication connection between a Bluetooth hub and a Bluetooth device, establishing a second communication connection between the Bluetooth hub and a client device, receiving, at the Bluetooth hub, data from the client device via the second communication connection, and forwarding the data from the Bluetooth hub to the Bluetooth device via the first communication connection.

Consistent with some embodiments, this disclosure provides another device for supporting wireless communication is provided. The device may comprise a first Bluetooth chip for communicating with a Bluetooth device and a second Bluetooth chip for communicating with a client device. The second Bluetooth chip may be configured to receive advertising data of the Bluetooth device from the first Bluetooth chip and broadcast advertising data including the received advertising data of the Bluetooth device. The first Bluetooth chip and the second Bluetooth chip may be configured to establish communication links between the client device and the second Bluetooth chip, between the second Bluetooth chip and the first Bluetooth chip, and between the first Bluetooth chip and the Bluetooth device.

Consistent with some embodiments, this disclosure provides another method for supporting wireless communication. The method may be implementable by a device comprising a first Bluetooth chip for communicating with a Bluetooth device and a second Bluetooth chip for communicating with a client device. The method may comprise receiving, by the second Bluetooth chip, advertising data of the Bluetooth device from the first Bluetooth chip, broadcasting, by the second Bluetooth chip, advertising data including the received advertising data of the Bluetooth device, and establishing, by the first Bluetooth chip and the second Bluetooth chip, communication links between the client device and the second Bluetooth chip, between the second Bluetooth chip and the first Bluetooth chip, and between the first Bluetooth chip and the Bluetooth device.

Consistent with some embodiments, this disclosure provides another device for supporting wireless communication between a first original device and a client device. The device for supporting the wireless communication comprises a first chip and a second chip. The second chip may be configured to acquire the broadcast data of the first original device and modify the broadcast data, broadcast the modified broadcast data, receive the client device's connection request and establish a first communication link between the client device and second chip, and communicate the connection request to the first chip. The first chip may be configured to initiate another connection request to the first original device, establish a second communication link between the first chip and the first original device, and establish a third communication link between the first chip and the second chip.

Additional objects and advantages of the present disclosure will be set forth in part in the following detailed description, and in part will be obvious from the description, or may be learned by practice of the present disclosure. The objects and advantages of the present disclosure will be realized and attained by means of the elements and combinations particularly pointed out in the appended claims.

It is to be understood that the foregoing general description and the following detailed description are exemplary and explanatory only, and are not restrictive of the invention, as claimed.

BRIEF DESCRIPTION OF THE DRAWINGS

The accompanying drawings, which constitute a part of this specification, illustrate several embodiments and, together with the description, serve to explain the disclosed principles.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise. It is intended that the following detailed description be considered as exemplary only, with the true scope and spirit being indicated by the following claims.

The illustrated components and steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Figure 1:
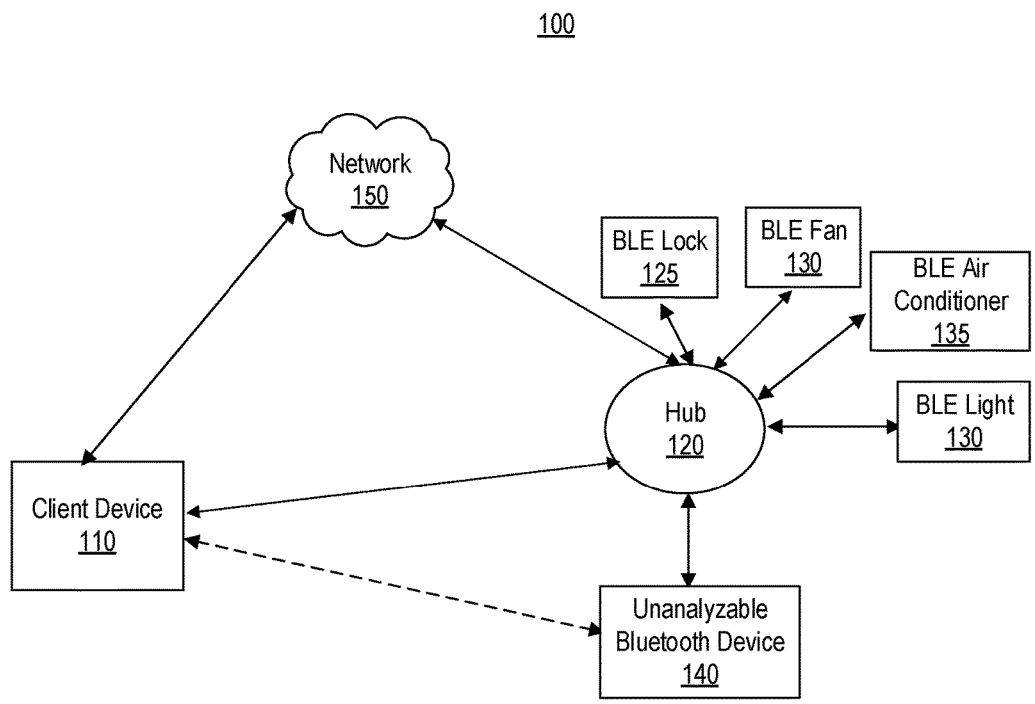
FIG. 1 illustrates an exemplary system environment for implementing methods and systems consistent with the present disclosure.

FIG. 1 illustrates an exemplary system environment 100 for implementing methods and systems consistent with the present disclosure. The system environment 100 shown in FIG. 1 includes a Bluetooth-enabled client device 110, a hub 120, a plurality of Bluetooth devices 125-140, and a network 150. As shown in FIG. 1, the Bluetooth devices includes BLE lock 125, BLE fan 130, BLE air conditioner 135, and BLE light 130 that are analyzable by hub 120. The Bluetooth devices may also include unanalyzable Bluetooth devices, such as unanalyzable Bluetooth device 140 shown in FIG. 1. Analyzable Bluetooth devices are configured with service characteristics that can be found in a database stored locally in the hub 120, allowing the hub 120 to communicate with the Bluetooth devices based on the stored service characteristics. Unanalyzable Bluetooth devices are configured with service characteristics that cannot be found in a database stored locally in the hub 120, and thus the hub 120 may not be able to perform application layer communication with the unanalyzable Bluetooth devices. On the other hand, the hub 120 may be able to extend the radio frequency (RF) communication range of the unanalyzable Bluetooth devices by performing link layer operations even though application layer communication may not be feasible.

In the present disclosure, a client device refers to a Bluetooth device configured to access remote resources over a Bluetooth link, such as a smart phone, a personal computer, or the like. The Bluetooth devices 125-140 may also be referred to as server devices which are configured to provide resources to a remote client, or be controllable by a remote client. The BLE devices shown in FIG. 1 serve as examples of Bluetooth devices, and other Bluetooth devices such as classical Bluetooth devices may be included in the system environment 100 without departing from the scope of the present disclosure. The system environment may also include more or less number of Bluetooth devices than those shown in FIG. 1.

As shown in FIG. 1, the hub 120 is capable to connect to both the Bluetooth devices 125-140 and the client device 110. The Bluetooth devices 125-140 may be connected to the hub 120 through Bluetooth communication links. For example, the Bluetooth devices 125-140 may communicate to the hub 120 using Bluetooth communication protocol. The client device 110 may communicate with the Bluetooth devices 125-140 via the hub 120. The client device 110 may communicate to the hub 120 through a Bluetooth communication link. The client device 110 may also communicate to the hub 120 using other wireless communication protocol, e.g., ZigBee, WiFi, etc.

For example, when the client device 110 desires to operate an analyzable Bluetooth device (e.g., BLE lock 125) via the hub 120, the hub 120 may receive a control command from the client device 110 on an application interface, and transmit corresponding Bluetooth packets to the BLE lock 125 based on the service characteristics of BLE lock 125 previously retrieved by the hub 120. Although a single client device is shown in FIG. 1, multiple client devices may be included in the system environment 100 for communicating with the Bluetooth devices via the hub 120.

The hub 120 may also operate to enhance RF range of a Bluetooth device (e.g., unanalyzable Bluetooth device 140). For example, referring to FIG. 1, the hub 120 may receive a radio signal from the client device 110, process the received signal, and send corresponding radio signal to the unanalyzable Bluetooth device 140, thereby enhancing the RF range of the unanalyzable Bluetooth device 140 and allowing it to communicate with the client device 110 that is located beyond the typical RF communication range of a Bluetooth device. In some embodiments, the hub 120 may amplify the received signal and/or suppress noise in the received signal from the Bluetooth device for enhancing its communication range. The hub 120 may also be called as a router, and in this disclosure, the terms of hub and router are intended to be inter-exchangeable.

Bluetooth devices may operate in one of two modes: as a master device or a slave device. The master device provides a network clock and determines the frequency hopping sequence, and the slave devices synchronize to the master's clock and follow the master's hopping frequency. For example, the client device 110 may operate as a master device, and the client device 110 may be a smart phone, a tablet, a computer, a laptop, a smart watch, a TV, or other Bluetooth devices with screens and operating systems. The Bluetooth devices 125-140 may operate as slave devices. Bluetooth slave devices may be speakers, headsets, microphones, printers, smart watches, cameras, TVs, monitors, wearable devices including wristbands, pedometers, activity trackers, sleep trackers, weight scales, etc., or devices to which Bluetooth sensors are attached to sense and send relevant electric parameters, such as home appliance including washing machines, vacuum cleaners, refrigerators, ovens, microwaves, etc.

In some embodiments, the client device 110 may communicate with the hub 120 through a network 150. For example, as shown in FIG. 1, the client device 110 may remotely communicate with the hub 120 via the network 150. The network 150 may be any type of network that provides communications, exchanges information, and/or facilitates the exchange of information between the hub 120 and client device 110. In one embodiment, the network 150 may be the Internet, a Local Area Network, a cellular communication network, a wireless local area network, or other suitable connections that allow the client devices to send and receive information to/from the hub 120. In some embodiments, the network 150 may include a remote cloud-based network system that can be accessed by both the client device 110 and the hub 120. For example, the client device 110 may control the hub 120 through a cloud server by using a smart phone application. Furthermore, the hub 120 may be configured to connect to a cloud server and capable of adaptively reconfigure itself based on the use history, interaction, and/or activities of the client device 110. For example, the hub 120 may be configured to update its database storing the service characteristics through the cloud server to include newly available service characteristics or update the existing service characteristics.

In the present disclosure, the wireless hub, wireless devices, and communication methods are described in connection with Bluetooth protocols. It should be understood, however, that the embodiments provided herein can be applied to scenarios where other wireless communication protocols are used without departing from the spirit and scope of the present disclosure.

Figure 2:
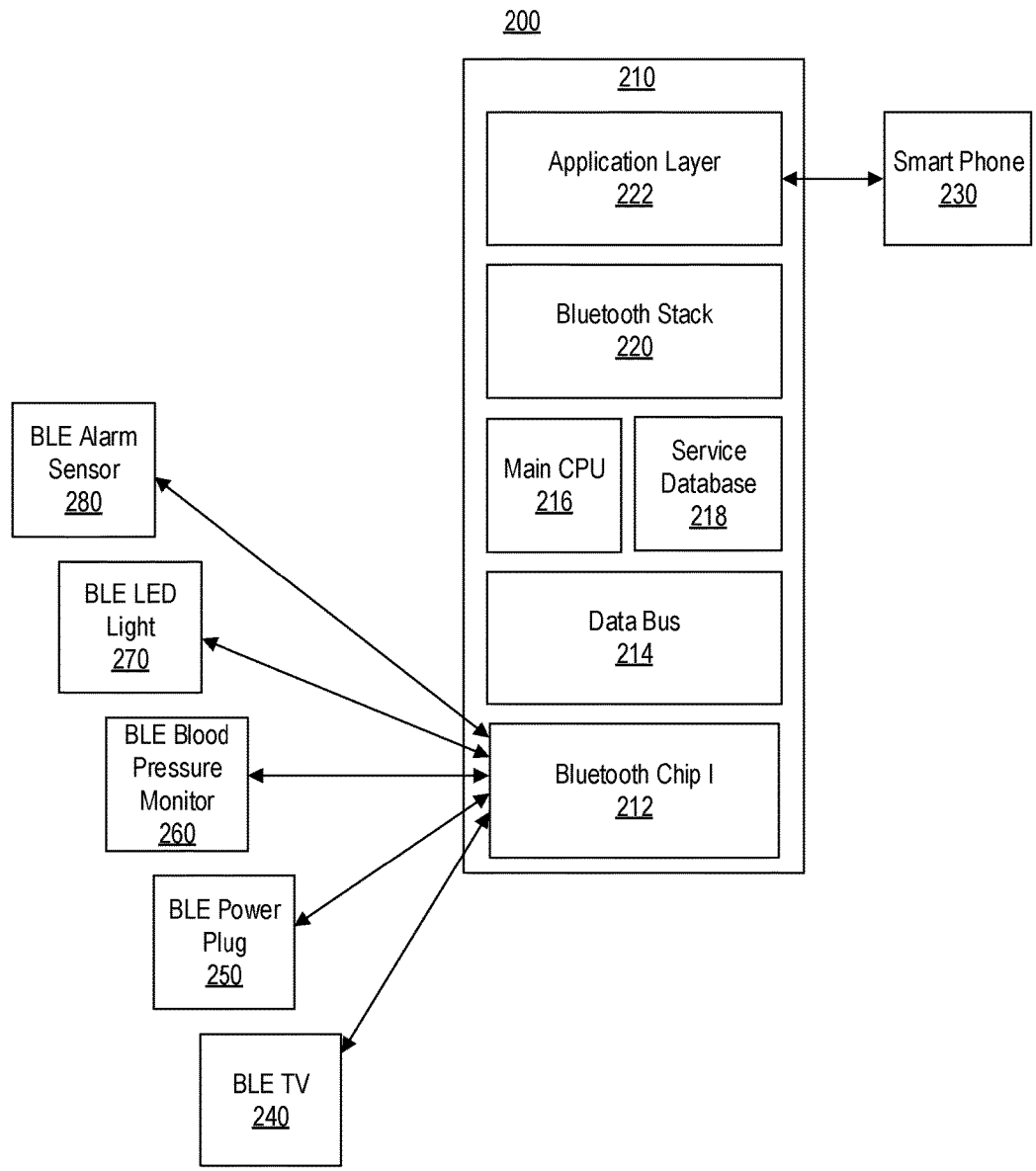
FIG. 2 illustrates an exemplary use scenario of a Bluetooth hub, in accordance with an embodiment of the present disclosure.

FIG. 2 illustrates an exemplary use scenario 200 of a Bluetooth hub, in accordance with an embodiment of the present disclosure. As shown in FIG. 2, the example use scenario 200 includes a Bluetooth hub 210, a smart phone 230, and a plurality of Bluetooth devices, such as a BLE TV 240, a BLE power plug 250, a BLE blood pressure monitor 260, a BLE LED light 270, and a BLE alarm sensor 280. Communication is to be established between the smart phone 230 and the Bluetooth devices through the Bluetooth hub 210. Specifically, the smart phone 230 acts as a Bluetooth-enabled client device that accesses resources and/or controls the operation of the Bluetooth devices 240-280. The Bluetooth devices 240-280 may also be referred to as Bluetooth server devices that provide data access to or be controllable by a remote client device. In this embodiment, the Bluetooth hub 210 provides an application interface for the smart phone 230 to operate the Bluetooth devices 240-280 and acts as a master device that controls the Bluetooth devices 240-280 based on information received from the smart phone 230.

As shown in FIG. 2, the Bluetooth hub 210 may include a Bluetooth chip 212, a data bus 214, a main CPU 216, a service database 218, a Bluetooth stack 220, and an application layer 222. The Bluetooth transceiver circuitry for transmitting and receiving Bluetooth signals may be integrated in the Bluetooth chip 212. The data bus 214 may transfer data between the Bluetooth chip 212 and other components of the Bluetooth hub 210, such as the CPU 216 or the service database 218. The CPU 216 may include one or more processors and may be configured to execute instructions associated with operations of the Bluetooth hub 210. Additionally, the CPU 216 may execute certain instructions and commands stored in a memory to provide wireless communication, for example, via the Bluetooth chip 212. The Bluetooth stack 220 may implement the higher layer functionalities provided in the Bluetooth protocol. The application layer 222 may be used for interacting with and managing end-user applications.

The service database 218 stores a plurality of service characteristics associated with Bluetooth services. The service database 218 may be stored in a memory included in the Bluetooth hub 210. A Bluetooth service, such as a heart rate service, may include one or more characteristics, such as heart rate measurement and body sensor location. Each characteristic may include a value used in the service along with properties and configuration information about how the value is accessed, displayed, or represented. For example, the service database 218 may include part or all standard characteristics defined by the Bluetooth Special Interest Group (SIG). The service database 218 may include service characteristics associated with a number of different types of Bluetooth devices produced by the same or different manufacturers. In some implementations, the service database 218 may be updated via an Internet to include additional newly developed services and characteristics and/or to update configurations of the existing services and characteristics.

The Bluetooth hub 210 may also include other auxiliary components, such as a network interface for communicating with the smart phone 230. The Bluetooth hub 210 may also include random access memory (RAM), read only memory (ROM), secondary storage (for example, a hard disk drive or flash memory), and so on. One skilled in the art will readily appreciate that various other components can also be included in the Bluetooth hub 210.

The Bluetooth hub 210 may communicate with the smart phone 230 on the application layer level, and communicate with the Bluetooth devices 240-280 on the link layer level. For example, the Bluetooth hub 210 may communicate with the smart phone 230 using WiFi, Bluetooth, or other communication protocols. When communicating with the Bluetooth devices 240-280, the Bluetooth hub 210 may operate as a master device that initiates an outgoing connection request to one of the Bluetooth devices 240-280 that serve as slave devices and accept an incoming connection request after advertising.

The Bluetooth hub 210 may determine whether each of the Bluetooth devices is an analyzable device before sending a command to control its operation. For example, the Bluetooth devices may transmit advertising packets for a master device to detect and establish connection with the Bluetooth devices. After detecting advertising packets of a Bluetooth device, the Bluetooth hub 210 may establish a connection with the Bluetooth device and retrieve the service characteristics associated with the Bluetooth device. If each of the service characteristics associated with the Bluetooth device is included in the service database 218, the Bluetooth hub 210 may determine that the Bluetooth device is analyzable and may perform operations on the Bluetooth device based on input from a client device, such as the smart phone 230, via a network interface. For example, the Bluetooth hub 210 may access data stored in the Bluetooth device or control the operation of the Bluetooth device according to the attributes defined in the corresponding service characteristic. If one or more of the service characteristics associated with the Bluetooth device are not included in the service database 218, the Bluetooth hub 210 may determine that the Bluetooth device is unanalyzable and may decline any request received from the smart phone 230 to operate the Bluetooth device. For example, if a request to operate on an unanalyzable Bluetooth device is received from the smart phone 230, the Bluetooth hub 210 may notify the smart phone 230 that the Bluetooth device is unanalyzable and the requested operation cannot be performed.

In some implementations, the Bluetooth hub 210 may maintain a list of analyzable Bluetooth devices, and once a request is received from a client device to operate on a Bluetooth device that is included in the list, the Bluetooth hub 210 may establish a connection with the Bluetooth device for performing the requested operation with the Bluetooth device. In doing so, the Bluetooth hub 210 may manage a number of analyzable Bluetooth devices and allow a user of the client device to control the multiple Bluetooth devices in a uniform application interface. The Bluetooth hub 210 may update the list of analyzable Bluetooth devices when a new Bluetooth device is detected in the area, when the service database 218 is being updated, or upon an update request received from a client device.

If a detected Bluetooth device is unanalyzable by the Bluetooth hub 210, that is, one or more service characteristics of the Bluetooth device are not found in the service database 218, the Bluetooth hub 210 may not operate the unanalyzable Bluetooth device based on requests received from a client device. On the other hand, the Bluetooth hub 210 may operate as a transparent relay to extend the RF communication range of the unanalyzable Bluetooth device. The operation of the Bluetooth hub 210 as a transparent relay is to be described later in connection with FIGS. 4-14. Further, an unanalyzable Bluetooth device may become analyzable with the expansion of the service database 218.

Figure 3:
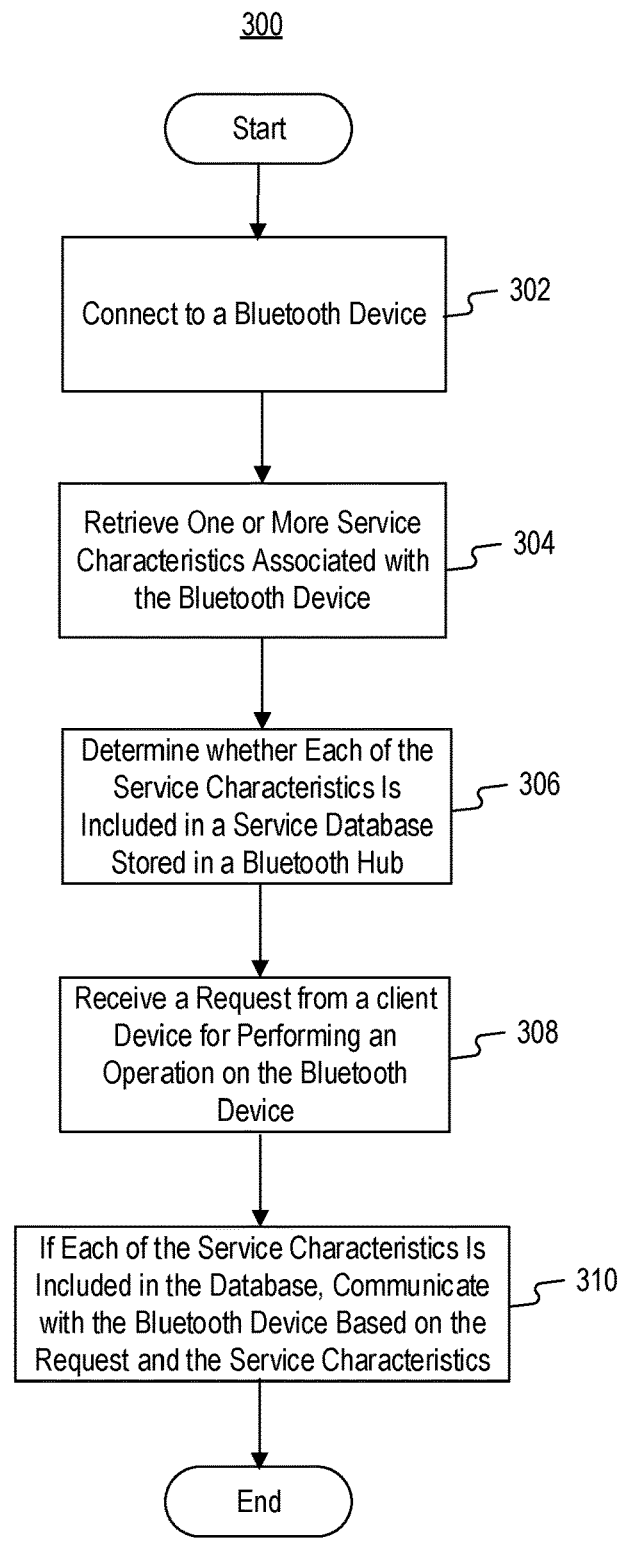
FIG. 3 is a flowchart of an exemplary method for supporting wireless communication between Bluetooth devices, in accordance with an embodiment of the present disclosure.

FIG. 3 is a flowchart of an exemplary method 300 for supporting wireless communication between Bluetooth devices, in accordance with an embodiment of the present disclosure. The method 300 may be performed by the Bluetooth hub 210 described above in connection with FIG. 2.

At step 302, the Bluetooth hub connects to a Bluetooth device via a Bluetooth transceiver. The Bluetooth transceiver may be integrated in a Bluetooth chip, such as the Bluetooth chip 212. For example, the Bluetooth hub may detect the presence of the Bluetooth device by receiving the advertising packets sent by the Bluetooth device and then initiate a connection with the Bluetooth device via the Bluetooth transceiver.

At step 304, the Bluetooth hub retrieves one or more service characteristics associated with the Bluetooth device. For example, the Bluetooth hub may send a read command to the Bluetooth device for retrieving the available service characteristics of the Bluetooth device. In some implementations, the service characteristics may be included in the advertising packets sent by the Bluetooth device, and in this situation, the Bluetooth hub may not need to establish a connection with the Bluetooth device to retrieve the service characteristics.

At step 306, the Bluetooth hub determines whether each of the service characteristics of the Bluetooth device is included in a service database stored locally in the Bluetooth hub. The Bluetooth hub may deem the Bluetooth device to be analyzable if each of the service characteristics of the Bluetooth device is included in the service database and deem the Bluetooth device to be unanalyzable otherwise. For example, the Bluetooth hub may compare each of the service characteristics of the Bluetooth device with the stored service characteristics. In some implementations, if one or more service characteristics of the Bluetooth device are not found in the service database, the Bluetooth hub may perform a lookup in the Internet, and if the unfound service characteristics are present in the Internet, the Bluetooth hub may download the service characteristics and store them in the service database.

At step 308, the Bluetooth hub receives a request, via a network interface, from a client device for performing an operation on the Bluetooth device. For example, the Bluetooth hub may receive a request from a smart phone in an application interface for turning on a BLE LED light. The communication between the Bluetooth hub and the client device may be performed over a WiFi network, a Bluetooth network, or other communication networks. The operation to be performed on the Bluetooth device may include accessing data stored in the Bluetooth device, sending data to the Bluetooth device, or any other control or data transfer between the client device and the Bluetooth device.

At step 310, if each of the service characteristics of the Bluetooth device is included in the service database, the Bluetooth hub communicates with the Bluetooth device based on the received request from the client device and the service characteristics of the Bluetooth device. For example, the Bluetooth hub may establish a connection with the Bluetooth device and send a request to the Bluetooth device for performing the operation requested by the client device. The request sent to the Bluetooth device may be a read or write operation on a specific attribute of a specific service characteristic of the Bluetooth device.

The Bluetooth hub may also forward any received data from the Bluetooth device to the client device. For example, after a write operation is sent to the Bluetooth device, the Bluetooth device may send a notification to the Bluetooth hub after the write operation is completed. After receiving the notification from the Bluetooth device at the link layer level, the Bluetooth hub may send an indication to the client device in the application interface indicating the successful completion of the request. As another example, after a read operation is sent to the Bluetooth device for accessing locally stored data of the Bluetooth device, the Bluetooth device may send the requested data to the Bluetooth hub. The Bluetooth hub may then send the received data in a format that is readable to the client device in the application interface.

The above described method 300 may be applied to a plurality of Bluetooth devices in a sequential manner. For example, if the client device requests to perform two separate operations on two different Bluetooth devices, both of which are analyzable devices, the Bluetooth hub may first establish a connection with the first Bluetooth device and send a request to the first Bluetooth device for performing the first operation. After the first operation is completed, the Bluetooth hub may establish a connection with the second Bluetooth device and send a request to the second Bluetooth device for performing the second operation. In some embodiments, when multiple Bluetooth devices are present and detected, the Bluetooth hub may determine, for each of the Bluetooth devices, whether it is analyzable by performing steps 302-306. The Bluetooth hub may store the determination results locally as to which Bluetooth devices are analyzable and which Bluetooth devices are unanalyzable, such that when an operation request on one of the Bluetooth devices is received from the client device, the Bluetooth hub may quickly determine whether the specific Bluetooth device is analyzable and as a result, whether the requested operation is feasible.

In some embodiments, the Bluetooth hub may operate as a transparent relay to extend the RF communication range between a Bluetooth device and a Bluetooth-enabled client device without requiring modification of the Bluetooth device. The Bluetooth device may be either analyzable or unanalyzable to the Bluetooth hub, and the Bluetooth device may be unaware of the existence of the Bluetooth hub.

Figure 4:
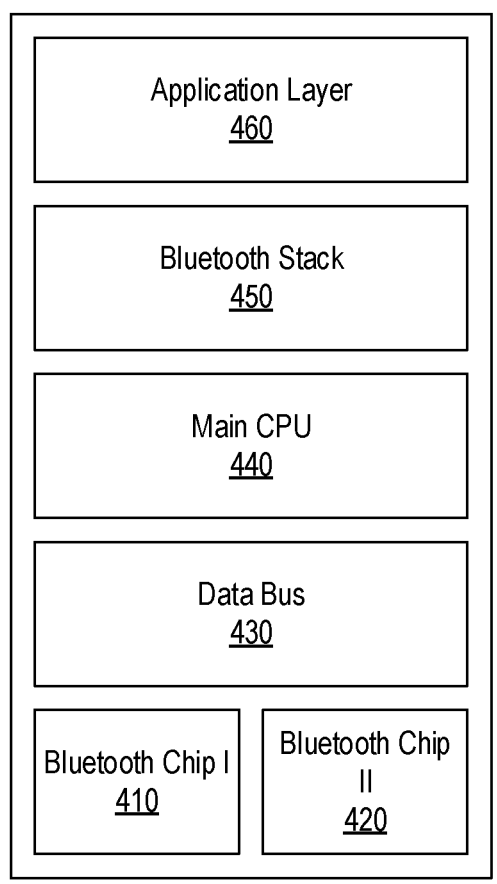
FIG. 4 illustrates an exemplary architecture of a Bluetooth hub, in accordance with an embodiment of the present disclosure.

FIG. 4 illustrates an exemplary architecture of a Bluetooth hub 400, in accordance with an embodiment of the present disclosure. As shown in FIG. 4, the Bluetooth hub 400 may include two Bluetooth chips 410 and 420, a data bus 430, a main CPU 440, a Bluetooth stack 450, and an application layer 460. The CPU 440 may be configured to execute instructions associated with operations of the Bluetooth hub 400. Additionally, the CPU 440 may execute certain instructions and commands to provide wireless communication via the Bluetooth chips 410 and 420. The Bluetooth stack 450 may implement the higher layer functionalities provided in the Bluetooth protocol. The application layer 460 may be used for interacting with and managing end-user applications. The Bluetooth hub 400 may also include other auxiliary components, such as random access memory (RAM), read only memory (ROM), secondary storage (for example, a hard disk drive or flash memory). One skilled in the art will readily appreciate that various other components can also be included in the Bluetooth hub 400.

The Bluetooth chips 410 and 420 may each include a Bluetooth transceiver and be configured to communicate with other Bluetooth devices. For example, the Bluetooth chip 410 may serve as a master device in a connection with a Bluetooth device, and the Bluetooth chip 420 may serve as a slave device in a connection with a Bluetooth-enabled client device, such as a smart phone.

Figure 5:
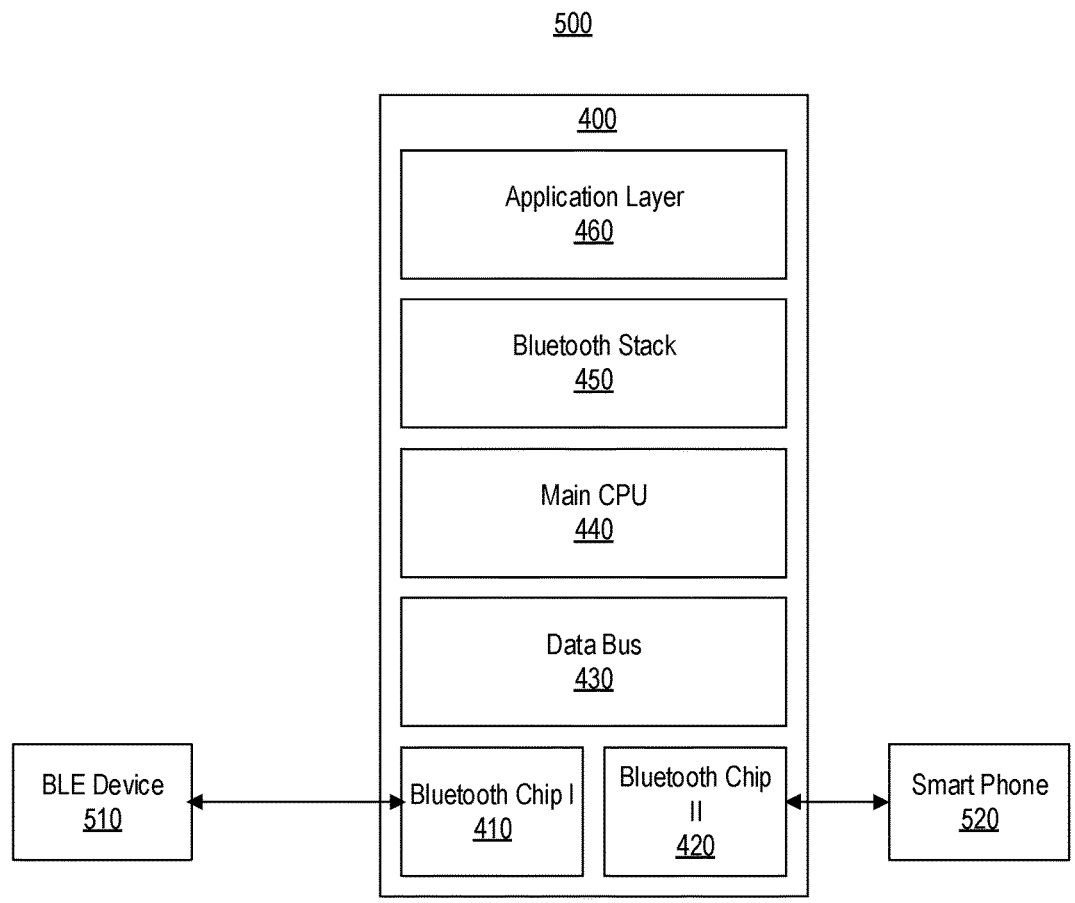
FIG. 5 illustrates an exemplary use scenario of a Bluetooth hub, in accordance with an embodiment of the present disclosure.

FIG. 5 illustrates an exemplary use scenario 500 of a Bluetooth hub, in accordance with an embodiment of the present disclosure. In this example scenario, communication is to be established between a Bluetooth device, such as a BLE device 510, and a client device, such as a smart phone 520, through the Bluetooth hub 400.

In some embodiments, the Bluetooth hub 400 may first establish a connection with the BLE device 510, e.g., using its first Bluetooth chip 410, to obtain service characteristics of the BLE device 510. For example, the Bluetooth hub 400 may scan for available Bluetooth devices via the first Bluetooth chip 410, detect the advertising packets transmitted by the BLE device 510, and store the data in the advertising packets. After a connection with the BLE device 510 is established, the Bluetooth hub 400 may retrieve the service characteristics of the BLE device 510 and store the retrieved service characteristics locally. An example of the retrieved service characteristics is illustrated in Table 1.

TABLE 1

| Example Service Characteristics | | |
|---|---|---|
| 0x0001 | 0x2800 | GATT Primary Service Declaration |
| 0x0002 | 0x2803 | GATT Characteristic Declaration |
| 0x0003 | 0x2A00 | Device Name |
| 0x0004 | 0x2803 | GATT Characteristic Declaration |
| 0x0005 | 0x2A01 | Appearance |
| 0x0006 | 0x2803 | GATT Characteristic Declaration |
| 0x0007 | 0x2A04 | Peripheral Preferred Connection Parameters |
| 0x0008 | 0x2800 | GATT Primary Service Declaration |
| 0x0009 | 0x2803 | GATT Characteristic Declaration |
| 0x000A | 0x2A05 | Service Changed |
| 0x000B | 0x2902 | Client Characteristic Configuration |
| 0x000C | 0x2800 | GATT Primary Service Declaration |
| 0x000D | 0x2803 | GATT Characteristic Declaration |
| 0x000E | 0x2A07 | Tx Power Level |
| 0x000F | 0x2800 | GATT Primary Service Declaration |

TABLE 1-continued

| Example Service Characteristics | | |
|---|---|---|
| 0x0010 | 0x2803 | GATT Characteristic Declaration |
| 0x0011 | 0x2A06 | Alert Level |
| 0x0012 | 0x2800 | GATT Primary Service Declaration |
| 0x0013 | 0x2803 | GATT Characteristic Declaration |
| 0x0014 | 0x2A06 | Alert Level |
| 0x001C | 0x2800 | GATT Primary Service Declaration |
| 0x001D | 0x2803 | GATT Characteristic Declaration |
| 0x001E | 0xFF01 | Unknown |
| 0x001F | 0x2803 | GATT Characteristic Declaration |
| 0x0026 | 0x2800 | GATT Primary Service Declaration |
| 0x0027 | 0x2803 | GATT Characteristic Declaration |
| 0x0028 | 0xFFE1 | Key Press State |
| 0x0029 | 0x2902 | Client Characteristic Configuration |

In Table 1, the first column represents the attribute handles of the service characteristics, the second column includes the attribute types, e.g., Universally Unique Identifiers (UUIDs) associated with each of the service characteristics, and the third column includes attribute values of each of the service characteristics. The attribute types provided in the second column may include the UUIDs defined by the Bluetooth SIG, and may also include customized identifiers defined by the manufacturers of Bluetooth devices. The attribute values provided in the third column may contain service declaration, characteristic declaration, characteristic value declaration, characteristic descriptor declaration, and/or other information about content of the attribute. Each of the service characteristics may include one or more attributes, and a main attribute allows access to the actual value of the characteristic.

After the connection with the BLE device 510 is established, the second Bluetooth chip 420 may generate a Generic Attribute Profile (GATT) server using the same service characteristics as those in the BLE device 510. The second Bluetooth chip 420 may start advertising and include the same data in the advertising packets as those in the advertising packets transmitted by the BLE device 510. In doing so, a virtual BLE device 510 may be created by the Bluetooth hub 400 for connecting to a Bluetooth-enabled client device, such as the smart phone 520.

In some implementations, the second Bluetooth chip 420 may also obtain the medium access control (MAC) address of the BLE device 510 and use the same MAC address for connecting to a Bluetooth-enabled client device, such as the smart phone 520. For example, certain BLE devices may limit access permission based on their MAC addresses, and using the MAC address of the BLE device by the second Bluetooth chip 420 may allow the same level of access permission to be granted. In some scenarios, there may exist two Bluetooth devices configured with the same MAC address, and cause interference to each other in the communication process. Thus, a neighboring MAC address may be used by the second Bluetooth chip 420. For example, if the MAC address of the BLE device 510 is AA:BB:CC:EE:FF, the second Bluetooth chip 420 may set its MAC address to be AA:BB:CC:EE:FE, thereby avoiding duplicate MAC addresses in the Bluetooth network.

After the second Bluetooth chip 420 creates the virtual BLE device, the smart phone 520 may initiate pairing with the second Bluetooth chip 420 of the Bluetooth hub 400. After the second Bluetooth chip 420 receives a pairing request from the smart phone 520, the first Bluetooth chip 410 may initiate pairing with the BLE device 510. In some implementations, the security setting of two Bluetooth links may be set at the same level. For example, each attribute item defined in the GATT server may be associated with certain operational restrictions, such as access permission, authentication permission, and authorization permission. Specifically, the access permission may be set as readable, writeable, or readable and writable. The authentication permission may be set as authentication required or no authentication required. The authorization permission may be set as authorization required or no authorization required. The access permission, authentication permission, and authorization permission of each attribute item may be set to be the same between the first and second Bluetooth link, where the first Bluetooth link is between the BLE device 510 and the first Bluetooth chip 410, and the second Bluetooth link is between the second Bluetooth chip 420 and the smart phone 520.

Figure 6:
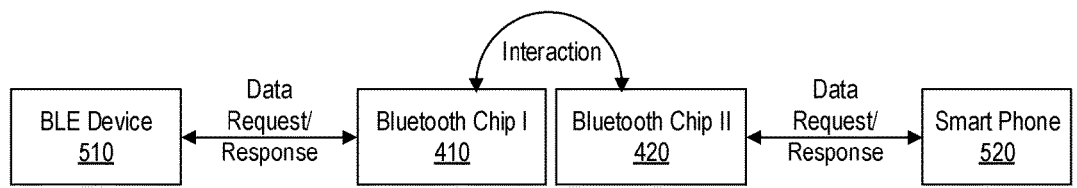
FIG. 6 illustrates an exemplary diagram of a data forwarding process, in accordance with an embodiment of the present disclosure.

FIG. 6 illustrates an exemplary diagram of a data forwarding process 600, in accordance with an embodiment of the present disclosure. As shown in FIG. 6, a first Bluetooth connection may be established between the first Bluetooth chip 410 and the BLE device 510, and data request and/or response may be transmitted over the first Bluetooth connection. A second Bluetooth connection may be established between the second Bluetooth chip 420 and the smart phone 520, and data request and/or response may be transmitted over the second Bluetooth connection.

When a data request is received from the smart phone 520 at the second Bluetooth chip 420, the second Bluetooth chip 420 may interact with the first Bluetooth chip 410, for example, through an internal data bus or be controlled by the main CPU, such that the first Bluetooth chip 410 may forward the data request to the BLE device 510. Similarly, when a response is received from the BLE device 510 at the first Bluetooth chip 410, the first Bluetooth chip 410 may interact with the second Bluetooth chip 420, for example, through an internal data bus or be controlled by the main CPU, such that the second Bluetooth chip 420 may forward the response to the smart phone 520. By forwarding the data request and response to the BLE device 510 and the smart phone 520 via the first and second Bluetooth chips 410 and 420, the RF communication range of the BLE device 510 may be effectively increased. Thus, communication may be carried out between the BLE device 510 and the smart phone 520 through the Bluetooth hub even when the RF communication range of the BLE device 510 by itself does not reach the smart phone 520.

In some scenarios, there may be a plurality of Bluetooth devices that requires assistance of the Bluetooth hub for forwarding a data request or response between the Bluetooth devices and a Bluetooth-enabled client device, such as a smart phone. If the Bluetooth chip does not support the Bluetooth hub acting as a master device and a slave device simultaneously (e.g., the Bluetooth 4.0 standard), more than one Bluetooth chip may be required in the Bluetooth hub to perform relaying for a plurality of Bluetooth devices, with at least one Bluetooth chip acting as a master device and at least another Bluetooth chip acting as a slave device. On the other hand, if the Bluetooth chip supports the Bluetooth hub acting as a master device and a slave device simultaneously (e.g., the Bluetooth 4.1 or 4.2 standard), the Bluetooth hub may include a single Bluetooth chip to perform relaying for a plurality of Bluetooth devices.

Figure 7:
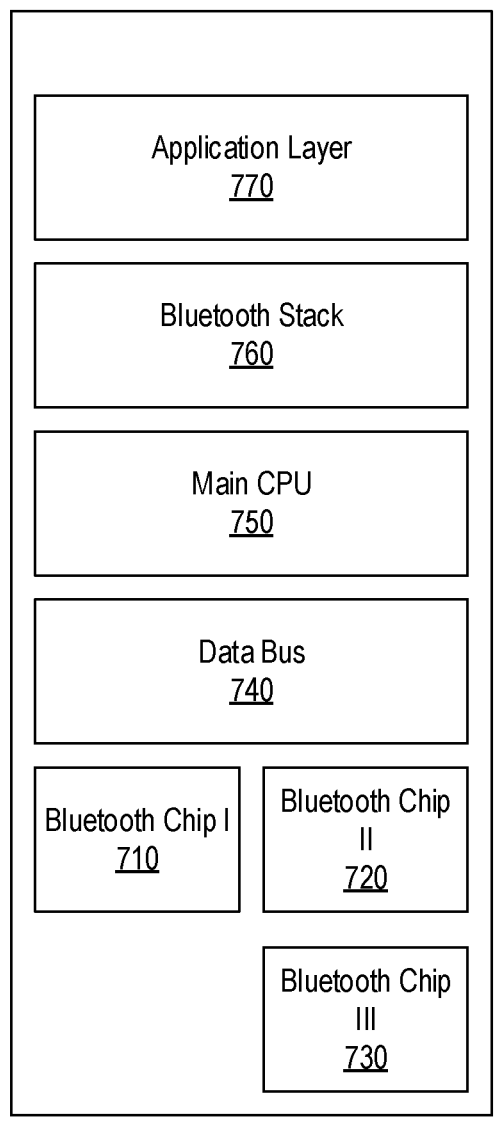
FIG. 7 illustrates another exemplary architecture of a Bluetooth hub, in accordance with an embodiment of the present disclosure.

FIG. 7 illustrates another exemplary architecture of a Bluetooth hub 700, in accordance with an embodiment of the present disclosure. As shown in FIG. 7, the Bluetooth hub 700 may include three Bluetooth chips 710, 720, and 730, a data bus 740, a main CPU 750, a Bluetooth stack 760, and an application layer 770. The data bus 740, main CPU 750, Bluetooth stack 760, and application layer 770 may be similar to those described in connection with FIGS. 2 and 4, which are not repeated herein.

The Bluetooth chips 710, 720, and 730 may each include a Bluetooth transceiver and be configured to communicate with other Bluetooth devices. For example, the first Bluetooth chip 710 may serve as a master device in a connection with a Bluetooth device, and the second and third Bluetooth chips 720 and 730 may serve as slave devices in a connection with a Bluetooth-enabled client device.

Figure 8:
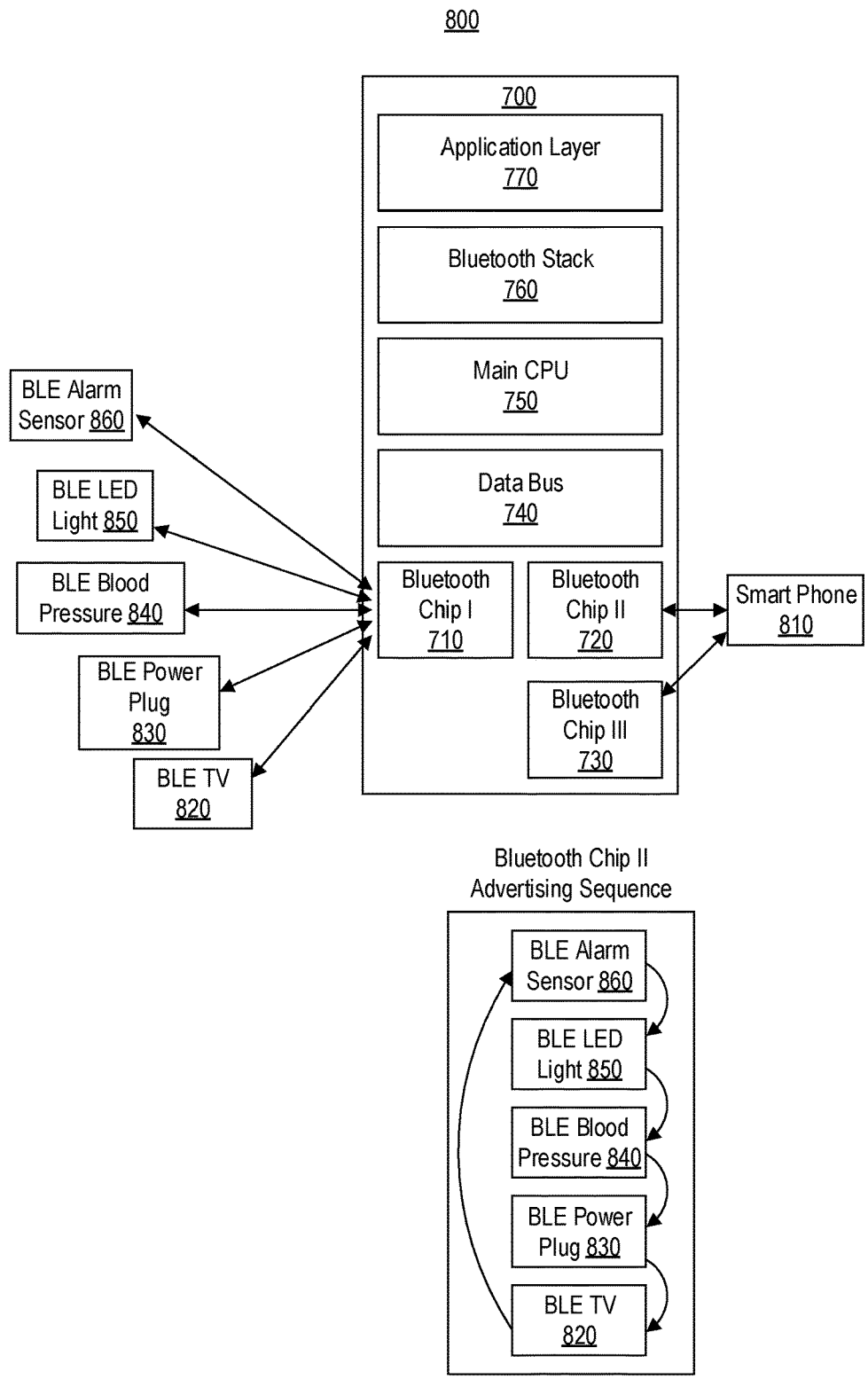
FIG. 8 illustrates another exemplary use scenario of a Bluetooth hub, in accordance with an embodiment of the present disclosure.

FIG. 8 illustrates an exemplary use scenario 800 of a Bluetooth hub, in accordance with an embodiment of the present disclosure. In this example scenario, communication is to be established between a client device, such as a smart phone 810, and a plurality of Bluetooth devices, such as a BLE TV 820, a BLE power plug 830, a BLE blood pressure monitor 840, a BLE LED light 850, and a BLE alarm sensor 860, through the Bluetooth hub 700.

The first Bluetooth chip 710 may act as a master device to control the various Bluetooth devices. The second and third Bluetooth chips 720 and 730 may act as slaves and communicate with the smart phone 810. By having two Bluetooth chips 720 and 730 to communicate with the smart phone 810, the Bluetooth hub 700 is capable to extend communications ranges for two Bluetooth devices, such as the BLE TV 820 and the BLE power plug 830, at the same time.

In some embodiments, the second Bluetooth chip 720 may broadcast advertising packets on behalf of each of the Bluetooth devices on a round-robin basis. As shown in FIG. 8, the second Bluetooth chip 720 may broadcast advertising packets containing advertising data of the BLE alarm sensor 860 for a certain time period, next broadcast advertising packets containing advertising data of the BLE LED light 850 for another time period, then broadcast advertising packets containing advertising data of the BLE blood pressure monitor 840 for another time period, and so on. The advertising period for each of the Bluetooth devices may be configured to be the same or to be different. The process for obtaining advertising data of the Bluetooth devices is similar to the process for obtaining the advertising data of a single Bluetooth device described above in connection with FIG. 5. The Bluetooth hub 700 may perform the same process for each of the Bluetooth devices sequentially to obtain advertising data of the multiple Bluetooth devices.

In some embodiments, where there are multiple Bluetooth chips serving as slave devices, e.g., the second and third Bluetooth chips 720 and 730, each of the slave chips may advertise for a subset of the Bluetooth devices. For example, the second Bluetooth chip 720 may broadcast advertising packets for the BLE alarm sensor 860, the BLE LED light 850, and the BLE blood pressure monitor 840 on a round-robin basis, while the third Bluetooth chip 730 may broadcast advertising packets for the BLE power plug 830 and the BLE TV 820.

After advertising, the Bluetooth hub 700 may receive data from the smart phone 810 for operating on one or more of the Bluetooth devices. The data may be received via the second Bluetooth chip 720 or the third Bluetooth chip 730. In response, the Bluetooth hub 700 may forward the data to the corresponding Bluetooth devices via the first Bluetooth chip 710. As the Bluetooth hub 700 includes two slave chips, i.e., the second Bluetooth chip 720 and the third Bluetooth chip 730, the Bluetooth hub 700 may be able to perform relaying for two Bluetooth devices simultaneously, with each of the second and third Bluetooth chips 720 and 730 operates as a slave device on behalf of one of the two Bluetooth devices.

Figure 9:
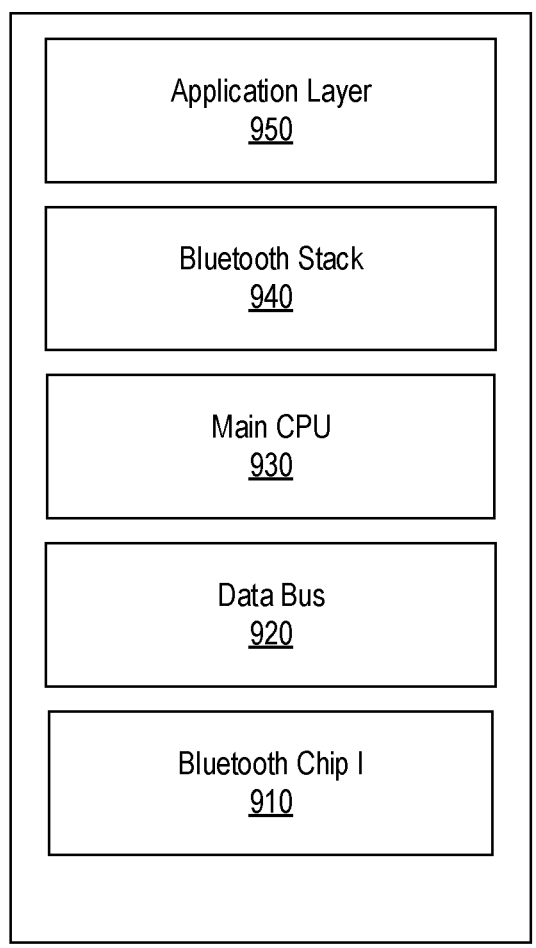
FIG. 9 illustrates another exemplary architecture of a Bluetooth hub, in accordance with an embodiment of the present disclosure.

FIG. 9 illustrates another exemplary architecture of a Bluetooth hub 900, in accordance with an embodiment of the present disclosure. As shown in FIG. 9, the Bluetooth hub 900 may include a single Bluetooth chip 910, a data bus 920, a main CPU 930, a Bluetooth stack 940, and an application layer 950. The data bus 920, main CPU 930, Bluetooth stack 940, and application layer 950 may be similar to those described in connection with FIGS. 2 and 4, which are not repeated herein.

The Bluetooth chip 910 may include a Bluetooth transceiver and be configured to communicate with other Bluetooth devices. Further, the Bluetooth chip 910 may be configured to act as a master device and a slave device simultaneously. For example, the Bluetooth chip 910 supporting Bluetooth 4.1 or 4.2 standard may serve as a master device controlling multiple Bluetooth devices, and simultaneously serve as slave devices in a connection with a Bluetooth-enabled client device.

Figure 10:
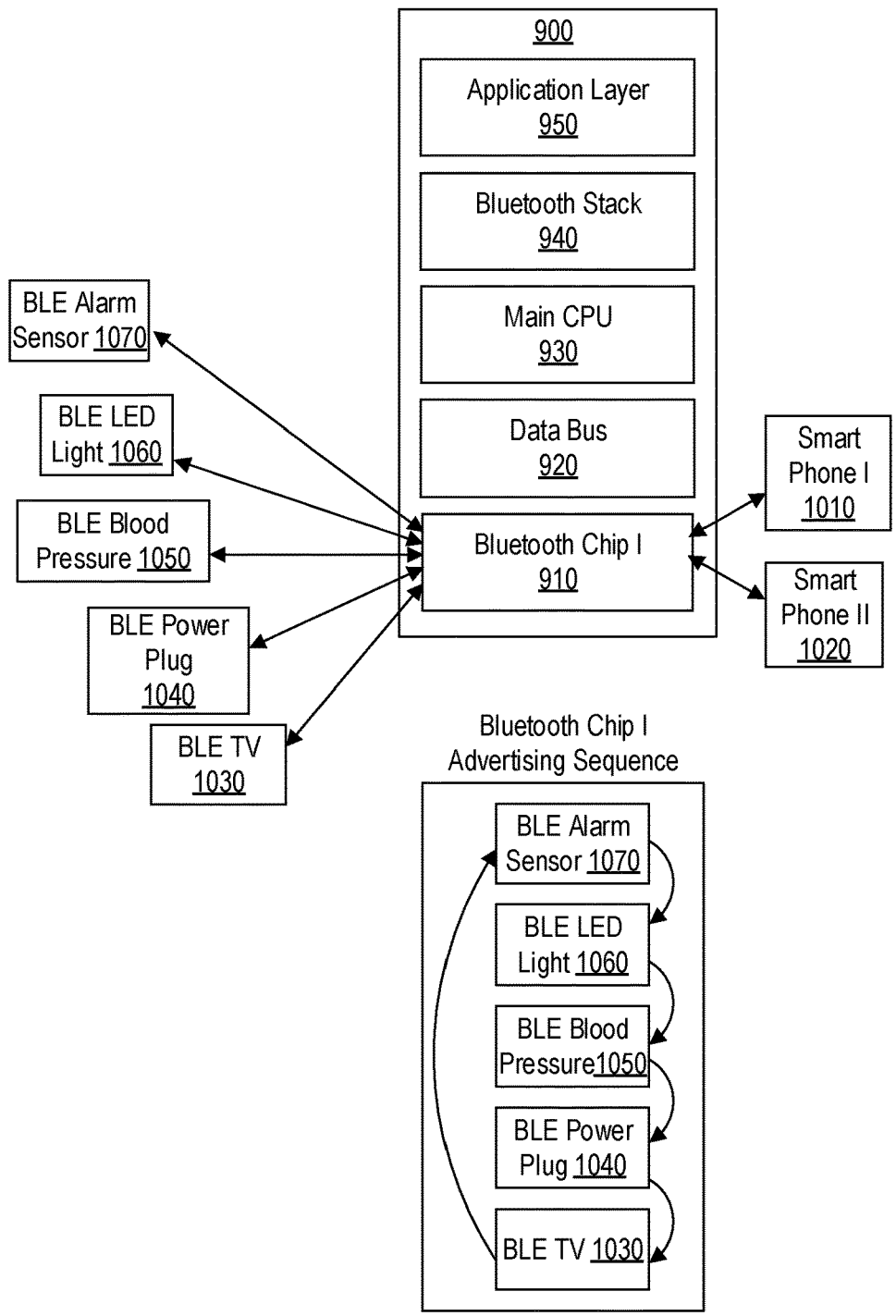
FIG. 10 illustrates another exemplary use scenario of a Bluetooth hub, in accordance with an embodiment of the present disclosure.

FIG. 10 illustrates an exemplary use scenario 1000 of a Bluetooth hub, in accordance with an embodiment of the present disclosure. In this example scenario, communication is to be established between client devices, such as a first smart phone 1010 and a second smart phone 1020, and a plurality of Bluetooth devices, such as a BLE TV 1030, a BLE power plug 1040, a BLE blood pressure monitor 1050, a BLE LED light 1060, and a BLE alarm sensor 1070, through the Bluetooth hub 900.

The Bluetooth chip 910 may act as a master device to control the various Bluetooth devices. Simultaneously, the Bluetooth chip 910 may act as slaves and communicate with the first smart phone 1010 and the second smart phone 1020. By acting as both a master device and a slave device, the Bluetooth chip 910 is capable to extend communications ranges for the Bluetooth devices.

In some embodiments, the Bluetooth chip 910 may broadcast advertising packets on behalf of each of the Bluetooth devices on a round-robin basis. As shown in FIG. 10, the Bluetooth chip 910 may broadcast advertising packets containing advertising data of the BLE alarm sensor 1070 for a certain time period, next broadcast advertising packets containing advertising data of the BLE LED light 1060 for another time period, then broadcast advertising packets containing advertising data of the BLE blood pressure monitor 1050 for another time period, and so on. The advertising period for each of the Bluetooth devices may be configured to be the same or to be different. The process for obtaining advertising data of the Bluetooth devices is similar to the process for obtaining the advertising data of a single Bluetooth device described above in connection with FIG. 5. The Bluetooth hub 900 may perform the same process for each of the Bluetooth devices sequentially to obtain advertising data of the multiple Bluetooth devices.

After advertising, the Bluetooth hub 900 may receive data from the first smart phone 1010 or the second smart phone 1020 for operating on one or more of the Bluetooth devices. The data may be received via the Bluetooth chip 910. In response, the Bluetooth hub 900 may forward the data to the corresponding Bluetooth devices via the Bluetooth chip 910. In some implementations, when operating as a slave device, the Bluetooth chip 910 may be connected to multiple Bluetooth-enabled client devices simultaneously, such as the first smart phone 1010 and the second smart phone 1020. Thus, both the first smart phone 1010 and the second smart phone 1020 may control the operation of a Bluetooth device through the Bluetooth hub 900.

Figure 11:
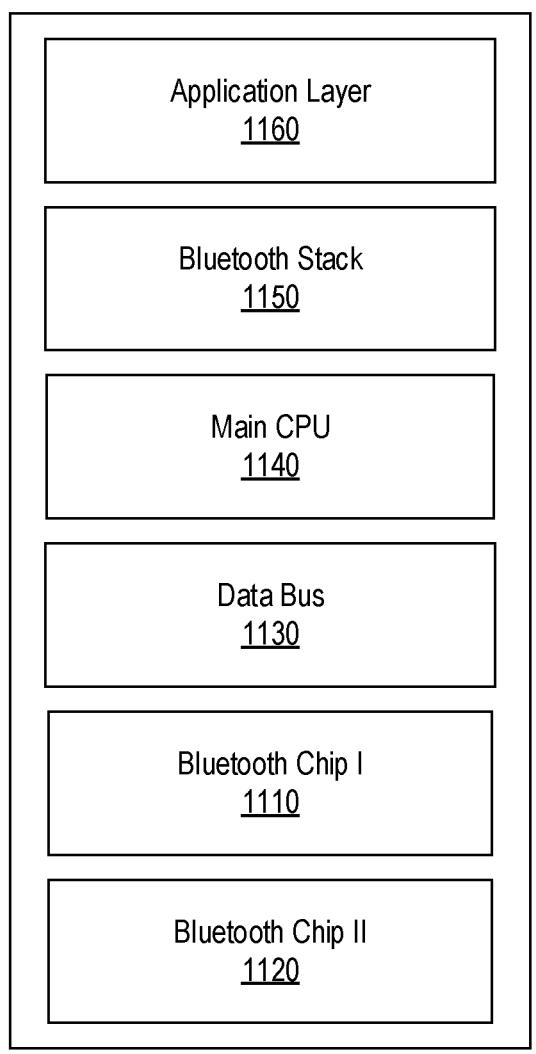
FIG. 11 illustrates another exemplary architecture of a Bluetooth hub, in accordance with an embodiment of the present disclosure.

FIG. 11 illustrates another exemplary architecture of a Bluetooth hub 1100, in accordance with an embodiment of the present disclosure. As shown in FIG. 11, the Bluetooth hub 1100 may include two Bluetooth chips 1110 and 1120, a data bus 1130, a main CPU 1140, a Bluetooth stack 1150, and an application layer 1160. The data bus 1130, main CPU 1140, Bluetooth stack 1150, and application layer 1160 may be similar to those described in connection with FIGS. 2 and 4, which are not repeated herein.

The Bluetooth chips 1110 and 1120 may each include a Bluetooth transceiver and be configured to communicate with other Bluetooth devices. The Bluetooth chips 1110 and 1120 may each act as a master device to control the various Bluetooth devices and simultaneously act as slaves and communicate with one or more Bluetooth-enabled client devices. For example, the first Bluetooth chip 1110 may serve as a master device in a connection with a Bluetooth device and simultaneously serve as a slave device communicating with a Bluetooth-enabled client device, and the second Bluetooth chip 1120 may serve as a master device in a connection with another Bluetooth device and simultaneously serve as a slave device communicating with another Bluetooth-enabled client device.

Figure 12:
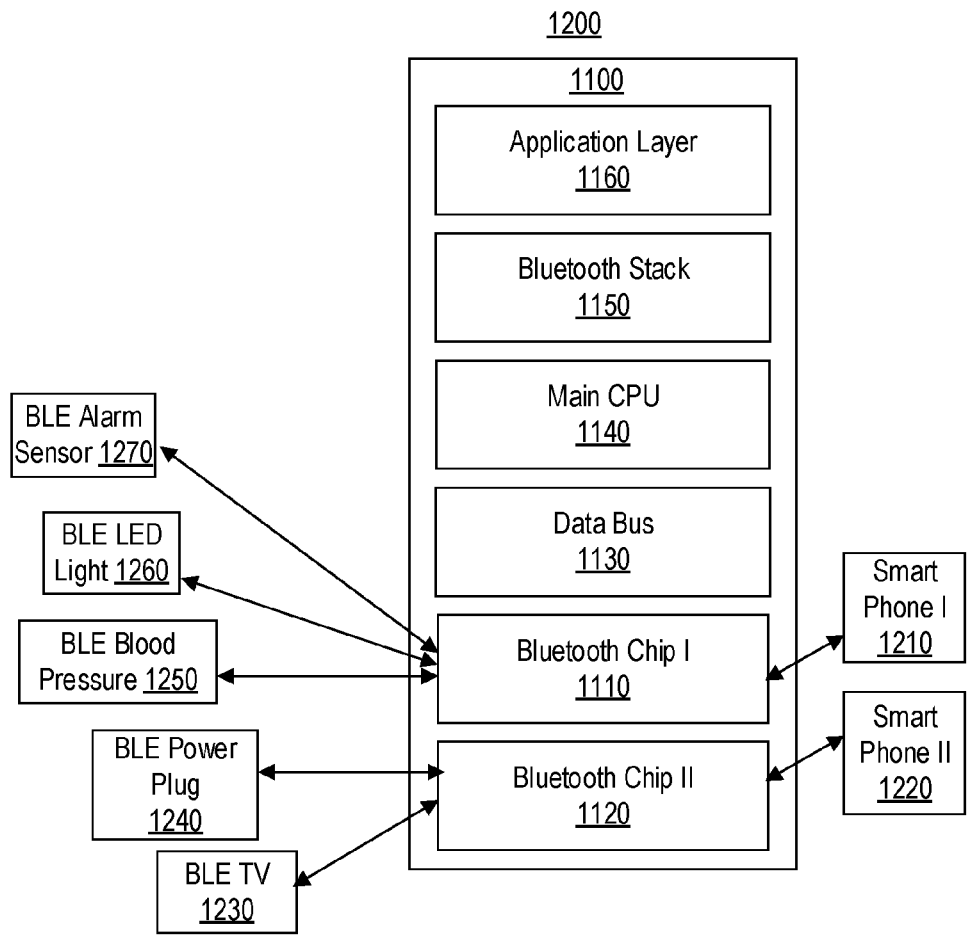
FIG. 12 illustrates another exemplary use scenario of a Bluetooth hub, in accordance with an embodiment of the present disclosure.
Figure 12:
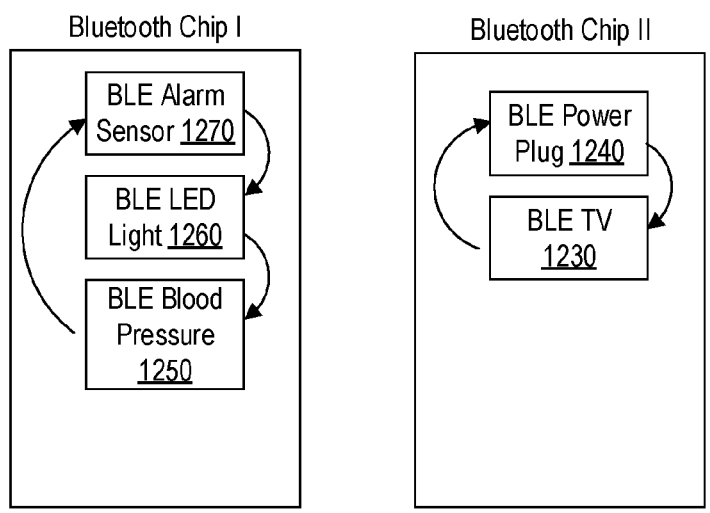

FIG. 12 illustrates an exemplary use scenario 1200 of a Bluetooth hub, in accordance with an embodiment of the present disclosure. In this example scenario, communication is to be established between client devices, such as a first smart phone 1210 and a second smart phone 1220, and a plurality of Bluetooth devices, such as a BLE TV 1230, a BLE power plug 1240, a BLE blood pressure monitor 1250, a BLE LED light 1260, and a BLE alarm sensor 1270, through the Bluetooth hub 1100.

The first Bluetooth chip 1110 and the second Bluetooth chip 1120 may each act as a master device to control a number of Bluetooth devices. Simultaneously, the first Bluetooth chip 1110 may act as a slave device in communicating with the first smart phone 1010, and the second Bluetooth chip 1120 may act as a slave device in communicating with and the second smart phone 1020.

In some embodiments, the first Bluetooth chip 1110 and the second Bluetooth chip 1120 may each broadcast advertising packets on behalf of the Bluetooth devices. As shown in FIG. 12, the first Bluetooth chip 1110 may broadcast advertising packets containing advertising data of the BLE alarm sensor 1270 for a certain time period, next broadcast advertising packets containing advertising data of the BLE LED light 1260 for another time period, then broadcast advertising packets containing advertising data of the BLE blood pressure monitor 1250 for another time period, and so on. The second Bluetooth chip 1120 may broadcast advertising packets containing advertising data of the BLE power plug 1240 for a certain time period, next broadcast advertising packets containing advertising data of the BLE TV 1230 for another time period, return to broadcast advertising packets containing advertising data of the BLE power plug 1240, and so on. The advertising period for each of the Bluetooth devices may be configured to be the same or to be different. The process for obtaining advertising data of the Bluetooth devices is similar to the process for obtaining the advertising data of a single Bluetooth device described above in connection with FIG. 5. The Bluetooth hub 1100 may perform the same process for each of the Bluetooth devices sequentially to obtain advertising data of the multiple Bluetooth devices.

After advertising, the Bluetooth hub 1100 may receive data from the first smart phone 1210 or the second smart phone 1220 for operating on one or more of the Bluetooth devices. The data may be received via the first Bluetooth chip 1110 or the second Bluetooth chip 1120. In response, the Bluetooth hub 1100 may forward the data to the corresponding Bluetooth devices via the first Bluetooth chip 1110 or the second Bluetooth chip 1120. In some implementations, when operating as a slave device, the first Bluetooth chip 1110 and the second Bluetooth chip 1120 may each be connected to multiple Bluetooth-enabled client devices simultaneously. For example, the first Bluetooth chip 1110 and the second Bluetooth chip 1120 may each be connected to additional smart phones in addition to the first smart phone 1210 or the second smart phone 1220.

Figure 13:
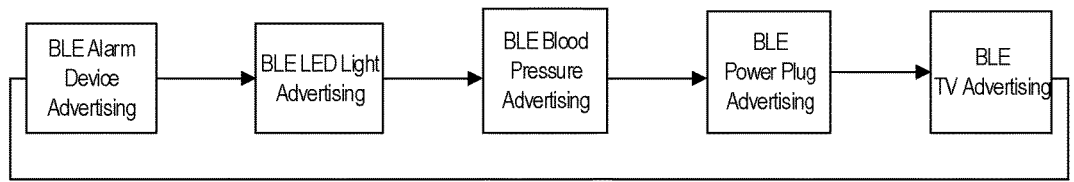
FIG. 13 illustrates an exemplary diagram of an advertising process of a Bluetooth hub, in accordance with an embodiment of the present disclosure.

FIG. 13 illustrates an exemplary diagram of an advertising process 1300 of a Bluetooth hub, in accordance with an embodiment of the present disclosure. As shown in FIG. 13, the Bluetooth hub may advertise for different Bluetooth devices at different time instant. For example, the Bluetooth hub may broadcast advertising packets containing advertising data of the BLE alarm sensor for a certain time period, next broadcast advertising packets containing advertising data of the BLE LED light for another time period, then broadcast advertising packets containing advertising data of the BLE blood pressure monitor for another time period, and so on. When switching from advertising for one Bluetooth device to another Bluetooth device, the Bluetooth hub may determine whether the next to be advertised Bluetooth device is a MAC address dependent device, that is, whether the discovery of the Bluetooth device relates to the MAC address of the device. For example, a Bluetooth device may set its access permission based on its MAC address, and a client device may connect to the Bluetooth device if the MAC address is within a certain range. Thus, the Bluetooth hub may change the MAC address of the Bluetooth chip that performs transmission of the advertising packets to match the MAC address of the Bluetooth device that will be next advertised, before starting to advertise for that Bluetooth device. For example, if the BLE LED light is a MAC address dependent device, at the end of the advertising period for the BLE alarm device, the Bluetooth hub may change the MAC address of the Bluetooth chip that performs transmission of the advertising packets to match the MAC address of the BLE LED light. In some implementations, changing the MAC address of a Bluetooth chip may require the chip to be reset.

If a connection request is received when the Bluetooth hub is advertising for a Bluetooth device, the Bluetooth hub may enter into a connection state as the Bluetooth device. For example, if the Bluetooth hub receives a connection request from a smart phone when advertising for the BLE LED light, the Bluetooth hub may change its GATT server database to match the database of the BLE LED light. Subsequently, data received from the smart phone by the Bluetooth hub may be forwarded to the BLE LED light. In some implementations, for example, when a Bluetooth 4.0 standard is used in the Bluetooth hub, the Bluetooth hub may stop the advertising process when it is in a connected state with the smart phone, and may resume advertising for other Bluetooth devices when the connection is terminated.

Figure 14:
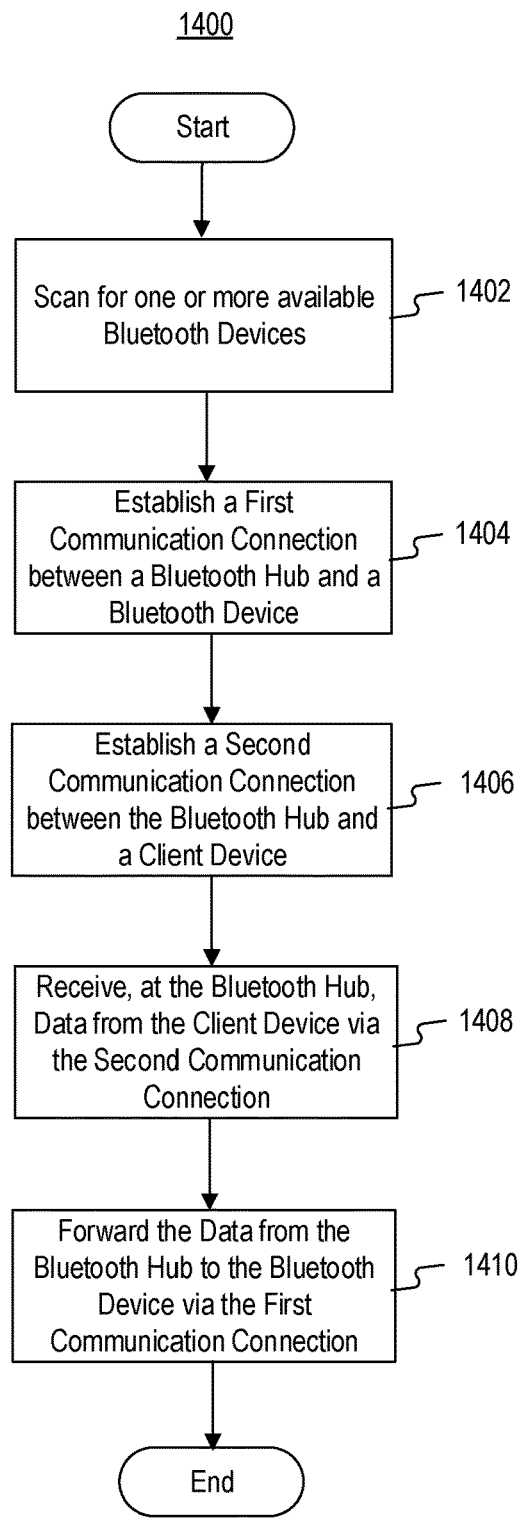
FIG. 14 is a flowchart of an exemplary method for supporting wireless communication between Bluetooth devices, in accordance with an embodiment of the present disclosure.

FIG. 14 is a flowchart of an exemplary method 1400 for supporting wireless communication between Bluetooth devices, in accordance with an embodiment of the present disclosure. The method 1400 may be performed by a Bluetooth hub described above in the present disclosure.

At step 1402, the Bluetooth hub scans for one or more available Bluetooth devices. For example, the Bluetooth hub may detect an advertising packet transmitted by a Bluetooth device via a Bluetooth transceiver. In some implementation, the Bluetooth hub may store the advertising data contained in the detected advertising packet in a local memory.

At step 1404, the Bluetooth hub establishes a first communication connection with a Bluetooth device. In some implementations, the Bluetooth hub may retrieve the service characteristics of the Bluetooth device and have them stored in a local memory. The Bluetooth hub may also retrieve the MAC address of the Bluetooth device and have it stored in a local memory.

At step 1406, the Bluetooth hub establishes a second communication connection with a Bluetooth-enabled client device. For example, the Bluetooth hub may advertise on behalf of the Bluetooth device, and during advertising, receive a connection request from the client device for establishing the second communication.

At step 1408, the Bluetooth hub receives data sent from the client device via the second communication connection. For example, the received data may be a request to access data stored in the Bluetooth device, to perform certain operation on the Bluetooth device, to modify certain settings of the Bluetooth device, or the like.

At step 1410, the Bluetooth hub forwards the received data to the Bluetooth device via the first communication connection. The Bluetooth device may send a response to the Bluetooth hub after receiving the forwarded data, and the Bluetooth hub may forward the response to the client device.

Figure 15:
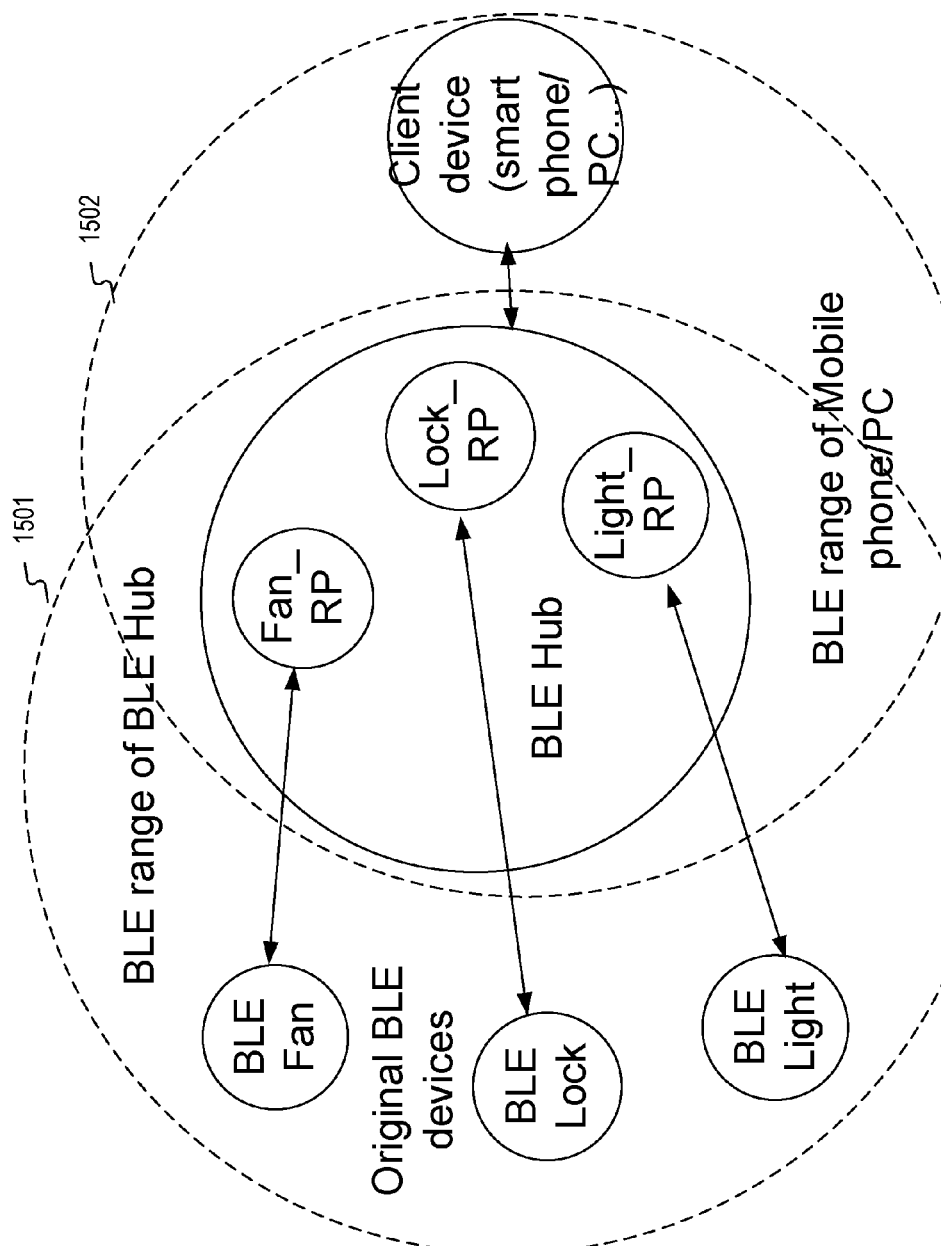
FIG. 15 is a schematic diagram of an application of a Bluetooth hub, which functions as a BLE relay, in accordance with an embodiment of the present disclosure.

FIG. 15 illustrates a schematic diagram of an application of a Bluetooth hub, which can function as a BLE relay, in accordance with some embodiments of the present disclosure. In this figure, the left dash circle 1501 represents the BLE range of a BLE hub, and the right dash circle 1502 represents the BLE range of a client device. As shown in FIG. 15, in some scenarios, BLE devices (for example, a BLE Fan, a BLE Lock, and/or a BLE Light) may be out of the communication range of a client device (such as a smart phone, tablet (pad), or a personal computer (PC)). The client device cannot find and connect with the BLE devices. However, if the BLE devices are in the communication range of the Bluetooth hub (e.g., within the dash circle 1501) and the client device is in the communication range of the Bluetooth hub (e.g., within the dash circle 1502), the BLE devices can be relayed via the Bluetooth hub to the client device. When the BLE devices are in advertising or broadcasting state, they broadcast advertising packets. The Bluetooth hub can detect the advertising packets, and create and advertise or broadcast packets including the same data as those in the advertising packets transmitted by the BLE devices. For example, the Bluetooth hub can clone the original advertising packets and add a suffix to the original advertising packets. By broadcasting the cloned advertising packets, the Bluetooth hub creates virtual devices corresponding to the original BLE devices. FIG. 15 shows three exemplary virtual BLE devices Fan_RP, Lock_RP, and Light_RP respectively corresponding to BLE Fan, BLE Lock, and BLE Light. The client device can detect the cloned advertising packets broadcasted by the Bluetooth hub and connect to the BLE devices through the Bluetooth hub.

In some embodiments, the Bluetooth hub may be able to create two types of virtual devices: static virtual devices and dynamic virtual devices. As discussed above, the Bluetooth hub may include two or more Bluetooth chips or modules. In the example of creating a static virtual device, the Bluetooth hub assigns one Bluetooth chip to one virtual device. In other words, the virtual device may occupy one Bluetooth chip unit, which, collaborating with the CPU and memory, copies or clones the advertising packets of the original BLE device (e.g., BLE Fan) and broadcasts the cloned advertising packets for the virtual device Fan_RP.

In the example of dynamic virtual devices, multiple BLE devices may occupy one Bluetooth chip unit jointly. For example, the virtual devices Lock_RP and Light_RP may occupy a second Bluetooth chip. The Bluetooth hub may alternately broadcast advertising packets for the dynamic virtual devices in a manner of time division multiplexing within a certain time cycle. As an example, the second Bluetooth chip may broadcast advertising packets on behalf of each of the Bluetooth devices on a round-robin basis. For example, the second Bluetooth chip may broadcast advertising packets containing advertising data of the virtual device Lock_RP for a certain time period, next broadcast advertising packets containing advertising data of the virtual device Light_RP for another time period, and so on. The advertising period for each of the Bluetooth devices may be configured to be the same or to be different. The process for obtaining advertising data of the Bluetooth devices is similar to the process for obtaining the advertising data of a single Bluetooth device described above. The Bluetooth hub may perform the same process for each of the Bluetooth devices sequentially to obtain advertising data of the multiple Bluetooth devices. The static virtual device example can be considered as a dynamic virtual device or the dynamic virtual device example can be considered as a static virtual device under a special kind of configuration, in which the number of the dynamic virtual devices assigned to one Bluetooth chip unit is one.

In the examples of this disclosure, the suffix of_RP is used to represent data packets for virtual devices relayed by the Bluetooth hub corresponding to the original data packets. A person having ordinary skill in the art should understand that other mechanisms can be used to represent the cloned or relayed data packets. When the client device detects advertising packets with the suffix of_RP, if the client device initiates connections to the devices, the corresponding Bluetooth chip unit in the Bluetooth hub will receive a connection request from the client device (a first link) and establish a connection (a second link) with the corresponding real BLE device. After the two links are both established, inside the Bluetooth hub, data sent from the client device to the virtual devices will be forwarded to the corresponding real BLE device, and vice versa. In this way, the relay function of communication of the Bluetooth hub can be fulfilled, and the communication range of the Bluetooth devices can be extended. The above embodiments use BLE devices as an example. A person having ordinary skill in the art should appreciate that the same technology can be applied to regular Bluetooth devices. In other words, by using the same technology and principles, the Bluetooth hub can extend communication range for regular Bluetooth devices.

Figure 16:
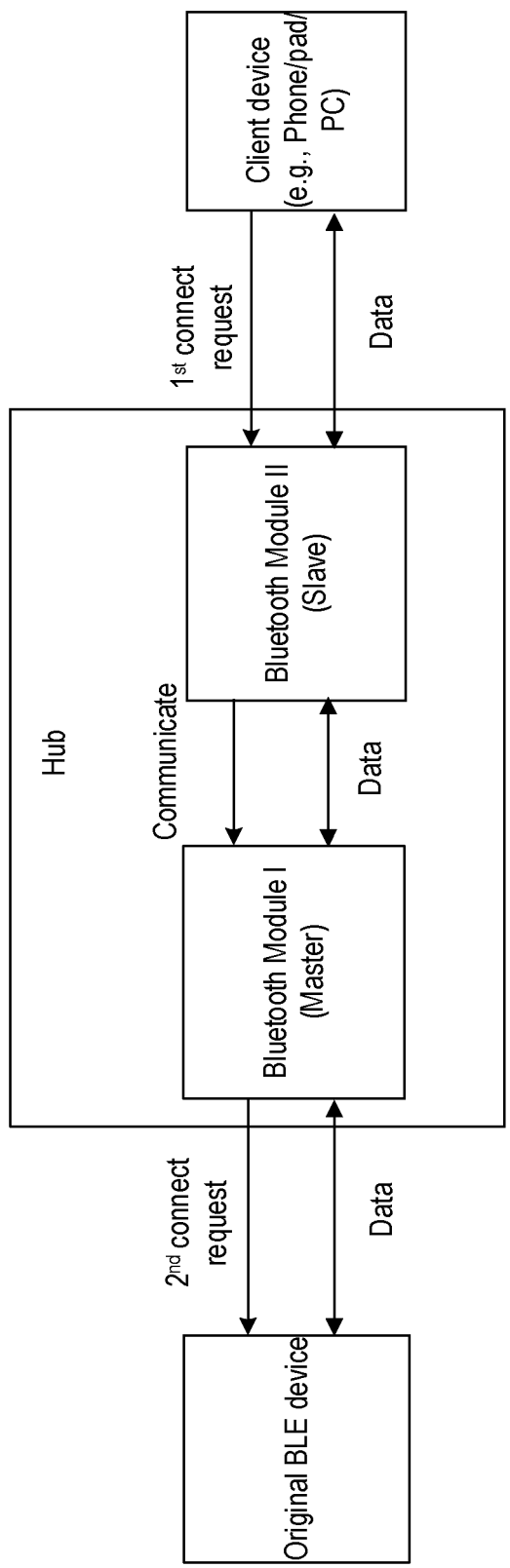
FIG. 16 is a schematic diagram showing that the Bluetooth hub relays communication between one BLE device and a client device, in accordance with an embodiment of the present disclosure.

FIG. 16 shows a specific example, in which the Bluetooth hub relays communication between one BLE device and a client device (e.g., a smart phone). In advertising or broadcasting state, a Bluetooth hub detects the advertising packets of an original BLE device through scanning, performs processing of cloning the advertising packets, and adding a name suffix_RP to the advertising packets or by another means to represent that these advertising packets are from a virtual device, and then broadcasts the processed advertising packets through a Bluetooth module II. Bluetooth module II can reside on a second Bluetooth chip. Because only one BLE device needs to be virtualized at this point, the Bluetooth module II operates in a static mode as discussed above. In other words, in this example, the BLE device is in a binding relationship with the Bluetooth module II inside the Bluetooth hub, which is used for virtualization. When the client device initiates a connection request to the virtual device, the Bluetooth module II communicates the request to a Bluetooth module I in the Bluetooth hub, which initiates a connection request to the original BLE device. Bluetooth module I can reside on a first Bluetooth chip. After the two BLE connections are established, data is bi-directionally relay-transmitted through data channels between the client device and Bluetooth module II, between Bluetooth module II and Bluetooth module I, and between Bluetooth module I and the BLE device, as shown in FIG. 16.

Figure 17:
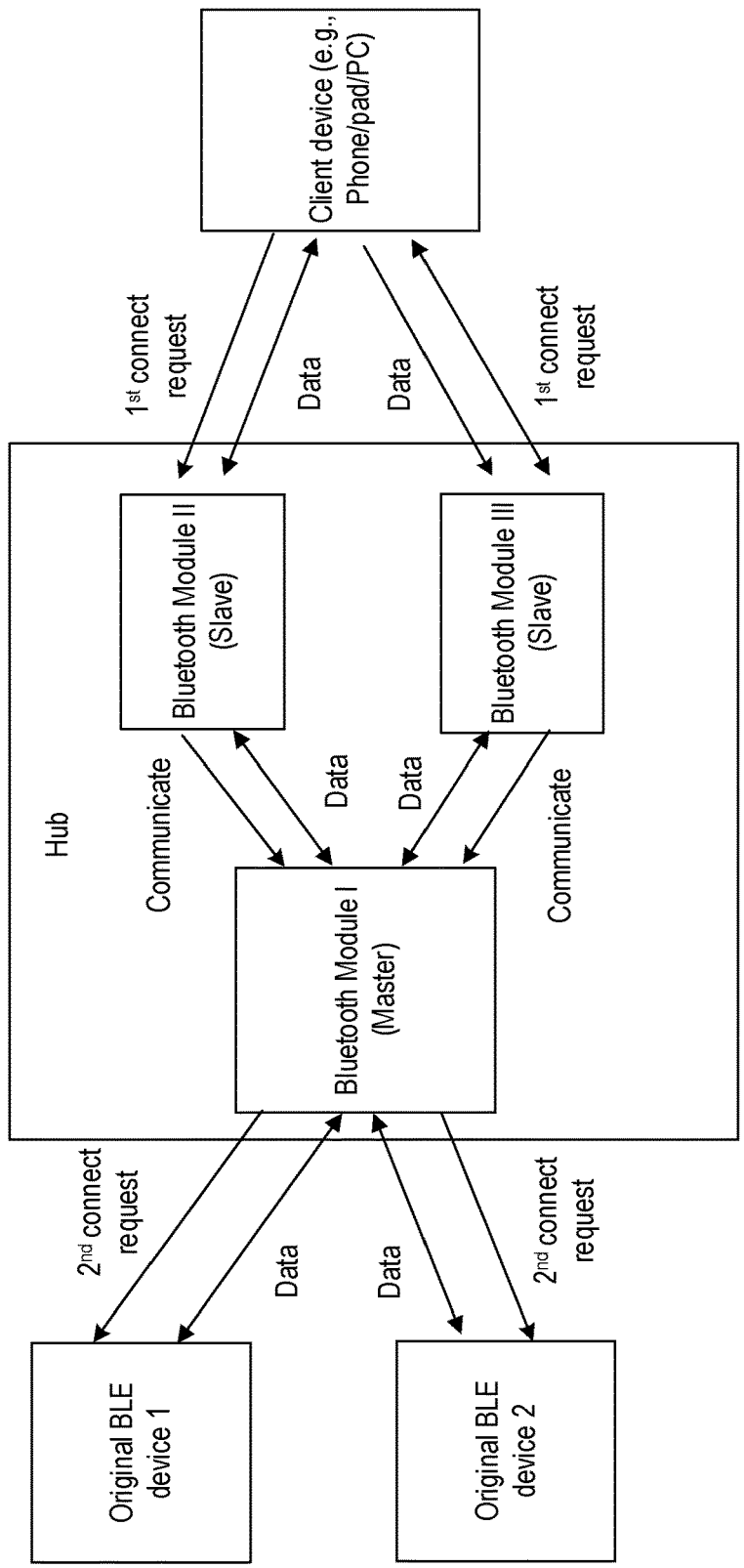
FIG. 17 shows a schematic diagram, in which the Bluetooth hub relays communication between multiple BLE devices and a client device, in accordance with an embodiment of the present disclosure.

FIG. 17 shows another example, in which the Bluetooth hub statically relays communication between multiple BLE devices and a client device (e.g., a smart phone). In an advertising state, a Bluetooth hub detects the broadcast packets of the original BLE devices (e.g., BLE Device1 and BLE Device2) through scanning, and then virtualizes the processed broadcasting packets, e.g., by cloning and adding a name suffix of_RP to the broadcasting packets, through a Bluetooth module II and a Bluetooth module III, where each module clones and virtualizes the bound original BLE device respectively. For example, the Bluetooth module II is assigned to original BLE Device1 and the Bluetooth module III is assigned to original BLE Device2. The Bluetooth modules II and III both operate in a static mode. When the client device initiates a connection request to the virtual devices, the corresponding Bluetooth module II or III communicates the request to a Bluetooth module I, which will initiate a connection request to the corresponding original BLE devices. After the two BLE connections are established, data is bi-directionally relay-transmitted through data channels between the client device and Bluetooth modules II and III, between Bluetooth modules II and III and Bluetooth module I, and between Bluetooth module I and the BLE devices, as shown in FIG. 17.

Figure 18:
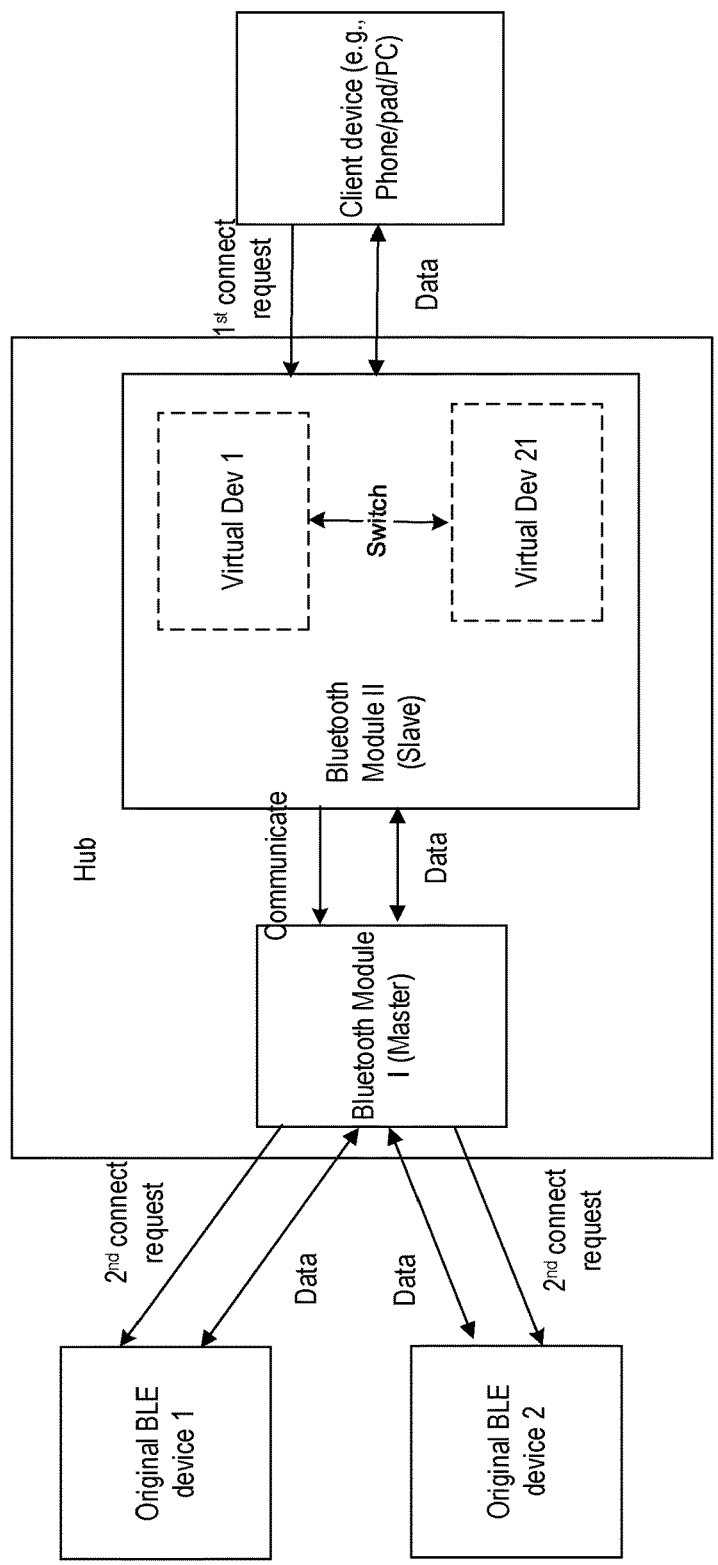
FIG. 18 shows a schematic diagram, in which the Bluetooth hub relays communication between multiple BLE devices and a client device, in accordance with an embodiment of the present disclosure.

FIG. 18 shows another example, in which the Bluetooth hub dynamically relays communication between multiple BLE devices and a client device (e.g., a smart phone). In an advertising state, a Bluetooth hub detects the advertising packets of the original BLE devices (e.g., BLE Device1 and BLE Device2) through scanning, and then virtualizes the broadcast information, e.g., by cloning and adding a name suffix of_RP to the advertising packets, through a Bluetooth module II. In this example, the Bluetooth module II operates in a dynamic mode. When the client device initiates a connection request to a BLE device represented by the Bluetooth module II, the Bluetooth module II communicates the request to a Bluetooth module I, which initiates a connection request to the corresponding original BLE device, whose virtual advertising packets are broadcasted currently by Bluetooth module II. After the two BLE connections are established, data is bi-directionally relay-transmitted through data channels between the client device and Bluetooth module II, between Bluetooth module II and Bluetooth module I, and between Bluetooth module I and the BLE device, as shown in FIG. 18. As shown in FIG. 18, Bluetooth module II operates in a dynamic mode, in which, it broadcasts advertising packets on behalf of BLE Device1 and BLE Device2 on a round-robin basis. For example, Bluetooth module II may broadcast advertising packets containing advertising data of the BLE Device1 for a certain time period, next broadcast advertising packets containing advertising data of the BLE Device2 for another time period, and so on. The advertising period for each of the Bluetooth devices may be configured to be the same or to be different. When the Bluetooth hub is broadcasting advertising packets for one virtual device (e.g., Virtual Dev1 corresponding to BLE Device1), if the client device intends to connect with BLE Device1, the client device can initiate the connection request, Bluetooth module II can transmit the request to Bluetooth module I, and Bluetooth module I can initiate the connection request to BLE Device1.

As discussed above, in some embodiments, in order to make BLE relay achieve a better effect as much as possible in terms of user experience, when a user uses a terminal device, like a cell phone, tablet, or computer to conduct Bluetooth scan, the name of a scanned virtual device is the name of the original device with the suffix of_RP. In some scenarios, when the distance between a user terminal device and the original device is short, it is likely that the original device and the virtual device with the word of_RP can both be detected by the user terminal device. The user can choose to connect either one. When the user connects the device with the word of_RP, a relay function by the Bluetooth hub will be triggered.

Figure 19:
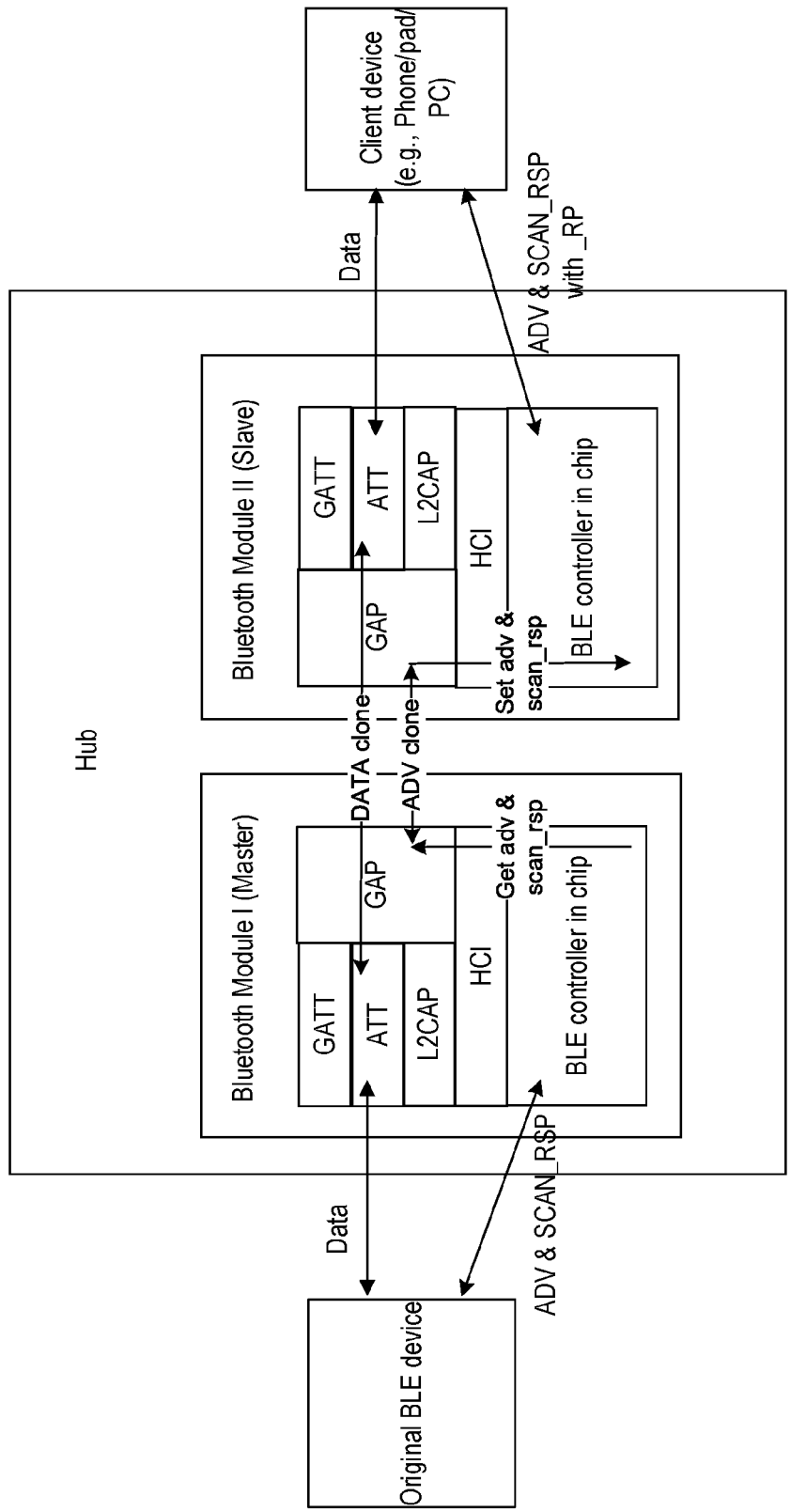
FIG. 19 shows an example of a protocol stack that the Bluetooth hub may use, in accordance with an embodiment of the present disclosure.

The Bluetooth hub may have a Bluetooth protocol stack implemented by hardware and software for each Bluetooth chip or module. Different Bluetooth chips or modules may have different protocols. FIG. 19 shows one example of a protocol stack that the Bluetooth hub may use. A person having ordinary skill in the art should appreciate that other protocol stacks may also be used with the inventions in this disclosure. As shown in FIG. 19, in some exemplary embodiments, the protocol stack may include these layers: HCI, L2CAP, ATT, and GATT. HCI (Host Controller Interface) provides a command interface to a baseband controller, link manager, and access to hardware status and control registers. L2CAP (Logical Link Control and Adaptation Protocol) is used to multiplex multiple logical connections between two devices using different higher level protocols. It also provides segmentation and reassembly of on-air packets. ATT (Attribute Protocol or Low Energy Attribute Protocol) allows a client to read and/or write certain attributes exposed by the server in a non-complex, low-power friendly manner. GATT (Generic Attribute Profile) is built on top of the Attribute Protocol and establishes common operations and a framework for the data transported and stored by the Attribute Protocol. The Bluetooth hub may include more protocols or different protocols, not limited to the ones described above. In addition, as shown in FIG. 19, each Bluetooth chip/module may include a BLE controller.

In some embodiments, on a protocol stack level, in order to improve the BLE passthrough performance, data forwarding in the BLE data links between the two BLE modules can get closer to a lower layer of a protocol stack as much as possible. However, in consideration of not affecting the stability of the protocol stack, the underlying logic of the protocol stack may not be changed significantly. As shown in FIG. 19, data can be forwarded directly on GAP (Generic Access Profile) and ATT protocol levels. In these exemplary embodiments, the dependence on the profile data in the device, such as GATT service, can be avoided, and a better effect in user experience can be achieved.

Figure 20:
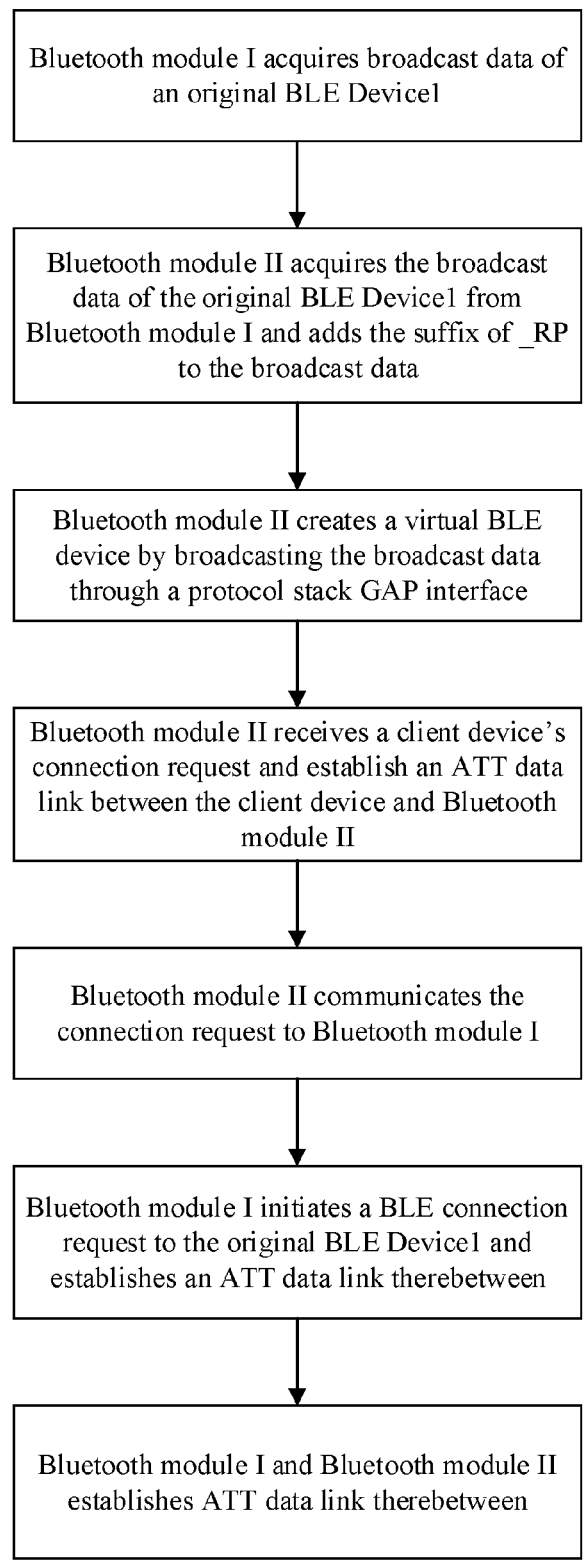
FIG. 20 shows a process flow of establishing a relay function by the Bluetooth hub according to an embodiment of the present disclosure.

FIG. 20 shows a process flow of establishing a relay function by the Bluetooth hub according to some embodiments of the present disclosure. Referring FIG. 20 in conjunction with FIGS. 15-19, an exemplary operation flow is described below. For example, an original BLE Device1's communication with a client device is to be relayed by the Bluetooth hub. Bluetooth module I of the Bluetooth hub, acting as a master to BLE Device1, can acquire the broadcast data (advertising packets or broadcasting packets) of the original BLE Device1 at any time. The specific content of the broadcast data can be acquired through a GAP protocol layer in the protocol stack, and no any actual BLE connection happens at this point. Bluetooth module II can acquire the broadcast data of the original BLE Device1 from Bluetooth module I, and add the suffix of_RP to the broadcast data. Bluetooth module II creates a virtual BLE device by broadcasting the broadcast data through a protocol stack GAP interface. At this time, remote client devices such as cell phones, tablets, and computers, can detect the broadcast information of the virtual device through BLE scan.

If a client device initiates a BLE connection request to the virtual device, a data channel between the client device and the virtual device (Bluetooth module II) can be established. The data channel can be an ATT data link in the BLE protocol stack. Bluetooth module II communicates the connection request to Bluetooth module I. Bluetooth module I initiates a BLE connection request to the original BLE Device1 and also establish an ATT data link therebetween. In some embodiments, the ATT data link can be established without involving any user protocol data, and can be a L2CAP logical link with a channel identifier (CID) assigned, and it can be established rapidly.

After the two ATT (Attribute Protocol) data links are established, the BLE relay function can be fulfilled by replicating and forwarding the two ATT data links between Bluetooth module I and Bluetooth module II, without interference from user data protocols.

The specification has described methods, devices, and systems for managing Bluetooth communication links and enhancing the communication range of Bluetooth devices. The illustrated steps are set out to explain the exemplary embodiments shown, and it should be anticipated that ongoing technological development will change the manner in which particular functions are performed. Thus, these examples are presented herein for purposes of illustration, and not limitation. For example, steps or processes disclosed herein are not limited to being performed in the order described, but may be performed in any order, and some steps may be omitted, consistent with disclosed embodiments. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

It is intended that the disclosure and examples be considered as exemplary only, with a true scope and spirit of disclosed embodiments being indicated by the following claims.

What is claimed is:

1. A device for supporting wireless communication, comprising:
   a first Bluetooth chip for communicating with a first Bluetooth device and a second Bluetooth device;
   a second Bluetooth chip for communicating with a client device; and
   a third Bluetooth chip for communicating with the client device, wherein:
   the second Bluetooth chip is configured to receive advertising data of the first Bluetooth device from the first Bluetooth chip and broadcast advertising data including the received advertising data of the first Bluetooth device, and the first Bluetooth chip and the second Bluetooth chip are configured to establish communication links between the client device and the second Bluetooth chip, between the second Bluetooth chip and the first Bluetooth chip, and between the first Bluetooth chip and the first Bluetooth device, and wherein the third Bluetooth chip is configured to receive advertising data of the second Bluetooth device from the first Bluetooth chip and broadcast advertising data including the received advertising data of the second Bluetooth device, and the first Bluetooth chip and the third Bluetooth chip are configured to establish communication links between the client device and the third Bluetooth chip, between the third Bluetooth chip and the first Bluetooth chip, and between the first Bluetooth chip and the second Bluetooth device.

2. The device for supporting wireless communication of claim 1, wherein:

the communication links between the client device and the second Bluetooth chip, between the second Bluetooth chip and the first Bluetooth chip, and between the first Bluetooth chip and the first Bluetooth device are Attribute Protocol data links.

3. The device for supporting wireless communication of claim 1, wherein the communication links between the client device and the third Bluetooth chip, between the third Bluetooth chip and the first Bluetooth chip, and between the first Bluetooth chip and the second Bluetooth device are Attribute Protocol data links.

4. The device for supporting wireless communication of claim 1, wherein:

the second Bluetooth chip is configured to receive advertising data of multiple Bluetooth devices from the first Bluetooth chip and alternately broadcast advertising data including the received advertising data of each of the Bluetooth devices.

5. The device for supporting wireless communication of claim 1, wherein:

the first and second Bluetooth devices and the client device are unable to directly communicate with each other via Bluetooth; and the first Bluetooth chip, the second Bluetooth chip and the third Bluetooth chip are configured to relay communications between the first and second Bluetooth devices and the client device.

6. The device for supporting wireless communication of claim 1, wherein:

the second Bluetooth chip is configured as a virtual device of the first Bluetooth device.

7. The device for supporting wireless communication of claim 1, wherein:

to broadcast the advertising data including the received advertising data of the first Bluetooth device, the second Bluetooth chip is configured to add a suffix to the received advertising data for broadcast.

8. A method for supporting wireless communication, implementable by a device comprising a first Bluetooth chip for communicating with a first Bluetooth device and a second Bluetooth device, a second Bluetooth chip for communicating with a client device, and a third Bluetooth chip also for communicating with the client device, the method comprising:

receiving, by the second Bluetooth chip, advertising data of the first Bluetooth device from the first Bluetooth chip;

broadcasting, by the second Bluetooth chip, advertising data including the received advertising data of the first Bluetooth device;

establishing, by the first Bluetooth chip and the second Bluetooth chip, communication links between the client device and the second Bluetooth chip, between the second Bluetooth chip and the first Bluetooth chip, and between the first Bluetooth chip and the first Bluetooth device;

receiving, by the third Bluetooth chip, advertising data of the second Bluetooth device from the first Bluetooth chip;

broadcasting, by the third Bluetooth chip, advertising data including the received advertising data of the second Bluetooth device; and establishing, by the first Bluetooth chip and the third Bluetooth chip, communication links between the client device and the third Bluetooth chip, between the third Bluetooth chip and the first Bluetooth chip, and between the first Bluetooth chip and the second Bluetooth device.

9. The method for supporting wireless communication of claim 8, wherein:

the communication links between the client device and the second Bluetooth chip, between the second Bluetooth chip and the first Bluetooth chip, and between the first Bluetooth chip and the first Bluetooth device are Attribute Protocol data links.

10. The method for supporting wireless communication of claim 8, wherein the communication links between the client device and the third Bluetooth chip, between the third Bluetooth chip and the first Bluetooth chip, and between the first Bluetooth chip and the second Bluetooth device are Attribute Protocol data links.

11. The method for supporting wireless communication of claim 8, wherein receiving, by the second Bluetooth chip, advertising data of the Bluetooth device from the first Bluetooth chip, and broadcasting, by the second Bluetooth chip, advertising data including the received advertising data of the Bluetooth device comprises: receiving, by the second Bluetooth chip, advertising data of multiple Bluetooth devices from the first Bluetooth chip; and comprises alternately broadcasting, by the second Bluetooth chip, advertising data including the received advertising data of each of the Bluetooth devices.

12. The method for supporting wireless communication of claim 8, wherein:

the first and second Bluetooth devices and the client device are unable to directly communicate with each other via Bluetooth; and establishing, by the first Bluetooth chip and the second Bluetooth chip, the communication links between the client device and the second Bluetooth chip, between the second Bluetooth chip and the first Bluetooth chip, and between the first Bluetooth chip and the first Bluetooth device comprises relaying, by the first Bluetooth chip and the second Bluetooth chip, communications between the first Bluetooth device and the client device.

13. The method for supporting wireless communication of claim 8, wherein:

broadcasting, by the second Bluetooth chip, advertising data including the received advertising data of the Bluetooth device comprises configuring the second Bluetooth chip as a virtual device of the first Bluetooth device.

14. The method for supporting wireless communication of claim 8, wherein:
   broadcasting, by the second Bluetooth chip, advertising data including the received advertising data of the first Bluetooth device comprises adding a suffix, by the second Bluetooth chip, to the received advertising data for broadcast.

15. A device for supporting wireless communication between a first and second original devices and a client device, wherein:
   the device for supporting the wireless communication comprises a first chip, a second chip and a third chip;
   the second chip is configured to:
      acquire the broadcast data of the first original device and modify the broadcast data;
      broadcast the modified broadcast data;
      receive the client device's connection request and establish a first communication link between the client device and second chip; and
      communicate the connection request to the first chip; and
   the first chip is configured to:
      initiate another connection request to the first original device;
      establish a second communication link between the first chip and the first original device; and
      establish a third communication link between the first chip and the second chip; and
   the third chip is configured to:
      receive advertising data of a second original device from the first chip;
      broadcast advertising data including the received advertising data of the second original device; and
      establish communication links between the client device and the third chip, between the third chip and the first chip, and between the first chip and the second original device.

16. The device for supporting wireless communication of claim 15, wherein:
   the first chip, the second chip and the third chip are Bluetooth chips;
   the first original device, the second original device and the client device are Bluetooth devices;
   the first, second, and third communication links are Attribute Protocol data links; and
   to broadcast the broadcast data, the second chip is configured to broadcast the modified broadcast data through a protocol stack Generic Access Profile interface to create a virtual device of the first original device.

17. The device for supporting wireless communication of claim 15, wherein:
   to acquire the broadcast data of the first original device, the second chip is configured to acquire the broadcast data of the first original device from the first chip, the broadcast data of the first original device acquired by the first chip from the first original device.

18. The device for supporting wireless communication of claim 15, wherein:
   to modify the broadcast data, the second chip is configured to add a suffix to the acquired broadcast data.

19. The device for supporting wireless communication of claim 15, wherein the second original device is a Bluetooth device, and the communication links between the client device and the third chip, between the third chip and the first chip, and between the first chip and the second original device are Attribute Protocol data links.

20. The device for supporting wireless communication of claim 15, wherein:
   the second chip is configured to receive advertising data of multiple devices from the first chip and alternately broadcast advertising data including the received advertising data of each of the multiple devices.

* * * * *